United States Patent
Beiber Hoeve et al.

(10) Patent No.: US 7,748,746 B2
(45) Date of Patent: Jul. 6, 2010

(54) FUEL TANK ARRANGEMENT FOR A VEHICLE

(75) Inventors: Jason William Beiber Hoeve, Stacy, MN (US); Mark W. Chevalier, Andover, MN (US); Ronald A. Vorndran, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 71 days.

(21) Appl. No.: 11/624,103

(22) Filed: Jan. 17, 2007

(65) Prior Publication Data

US 2008/0169148 A1    Jul. 17, 2008

(51) Int. Cl.
B62K 11/00    (2006.01)

(52) U.S. Cl. ........................ 280/835; 180/219
(58) Field of Classification Search .............. 180/219; 280/833, 835, 834
See application file for complete search history.

(56) References Cited

U.S. PATENT DOCUMENTS

| | | | |
|---|---|---|---|
| 3,021,855 A * | 2/1962 | Cartwright et al. ............ 137/38 |
| 3,311,183 A * | 3/1967 | Phillips ..................... 180/54.1 |
| 3,830,517 A | 8/1974 | McNeill |
| 3,935,445 A | 1/1976 | Preisler |
| 4,066,291 A | 1/1978 | Hickman |
| 4,083,263 A | 4/1978 | Lundquist |
| 4,133,402 A | 1/1979 | Soo Hoo |
| 4,145,068 A | 3/1979 | Toyomasu et al. |
| 4,203,500 A | 5/1980 | Kamiya |
| 4,241,933 A * | 12/1980 | Gratza et al. ................ 280/301 |
| 4,288,188 A | 9/1981 | Smith |
| 4,321,978 A | 3/1982 | Tominaga et al. |
| 4,322,088 A | 3/1982 | Miyakoshi et al. |
| 4,327,930 A | 5/1982 | Tominaga et al. |
| 4,353,590 A | 10/1982 | Wei-Chuan |
| 4,355,838 A | 10/1982 | Hickman |
| 4,377,295 A | 3/1983 | Lemman |
| 4,385,676 A | 5/1983 | Yoshimura |
| 4,422,659 A | 12/1983 | Nebu |
| 4,436,350 A | 3/1984 | Jolin |
| 4,438,828 A | 3/1984 | Nakagawa |
| 4,445,228 A | 4/1984 | Bruni |
| 4,445,587 A | 5/1984 | Hillman |
| 4,451,065 A | 5/1984 | Williams, Jr. |

(Continued)

FOREIGN PATENT DOCUMENTS

DE    11 18 632 B    11/1961

(Continued)

OTHER PUBLICATIONS www.harley-davidson.com—2007 Dyna Wide Glide—View from Driver's Seat, Jan. 17, 2007.*

(Continued)

*Primary Examiner*—Tony H. Winner
(74) *Attorney, Agent, or Firm*—Baker & Daniels LLP

(57) ABSTRACT

A two-wheeled vehicle, a touring motorcycle, is disclosed. The touring motorcycle may include multiple fuel storage tanks arranged in a split side-by-side configuration. The touring motorcycle may include a rear suspension having a linkage which moves in a direction not parallel with a centerline plane of the motorcycle. The touring motorcycle may include a tip-over structure which prevents unwanted tip-over of the motorcycle.

37 Claims, 25 Drawing Sheets

U.S. PATENT DOCUMENTS

| | | | |
|---|---|---|---|
| 4,465,156 A | 8/1984 | Richardson et al. |
| 4,469,190 A | 9/1984 | Yamaguchi |
| 4,489,973 A | 12/1984 | Willey |
| 4,508,944 A | 4/1985 | Yashima et al. |
| 4,529,056 A | 7/1985 | Kreuz |
| RE31,994 E | 10/1985 | Tominaga et al. |
| 4,544,044 A | 10/1985 | Boyesen |
| 4,561,519 A | 12/1985 | Omori |
| 4,565,909 A | 1/1986 | Yashima et al. |
| 4,577,719 A | 3/1986 | Nomura et al. |
| 4,588,196 A | 5/1986 | Williams, Jr. |
| 4,597,466 A | 7/1986 | Yamada |
| 4,615,556 A | 10/1986 | Stahel |
| 4,653,762 A | 3/1987 | Nakamura et al. |
| 4,690,237 A | 9/1987 | Funabashi et al. |
| 4,691,798 A | 9/1987 | Engelbach |
| 4,696,509 A | 9/1987 | Yagasaki et al. |
| 4,707,017 A | 11/1987 | Minobe et al. |
| 4,710,599 A | 12/1987 | Motodate et al. |
| 4,715,031 A | 12/1987 | Crawford et al. |
| 4,745,596 A | 5/1988 | Sato |
| 4,793,293 A | 12/1988 | Minami |
| 4,799,569 A * | 1/1989 | Hattori et al. ............... 180/219 |
| 4,830,135 A | 5/1989 | Yamashita |
| 4,830,423 A | 5/1989 | Nebu et al. |
| 4,847,454 A | 7/1989 | Hiruma |
| 4,881,614 A * | 11/1989 | Hoshi et al. ................. 180/225 |
| 4,887,687 A | 12/1989 | Asai et al. |
| 4,887,829 A | 12/1989 | Prince |
| 4,911,494 A | 3/1990 | Imai et al. |
| 4,928,781 A | 5/1990 | Kawano |
| 4,958,451 A | 9/1990 | Iwakura et al. |
| 4,981,121 A | 1/1991 | Tani |
| 4,989,665 A | 2/1991 | Yamagiwa et al. |
| 5,012,883 A | 5/1991 | Hiramatsu |
| 5,025,883 A | 6/1991 | Morinaka et al. |
| 5,040,168 A | 8/1991 | Maue et al. |
| D321,947 S | 11/1991 | Rudd et al. |
| 5,081,586 A | 1/1992 | Barthel et al. |
| 5,102,021 A | 4/1992 | Perea |
| 5,118,126 A | 6/1992 | Yaple |
| 5,301,767 A | 4/1994 | Shiohara |
| 5,311,514 A | 5/1994 | Cook |
| 5,375,677 A | 12/1994 | Yamagiwa et al. |
| 5,388,744 A | 2/1995 | Glorio et al. |
| RE34,897 E | 4/1995 | Richardson et al. |
| 5,418,526 A | 5/1995 | Crawford |
| 5,490,573 A | 2/1996 | Hagiwara et al. |
| 5,519,378 A | 5/1996 | Queensbury |
| 5,577,570 A * | 11/1996 | Shiohara et al. ............. 180/219 |
| 5,592,999 A | 1/1997 | Matsuura et al. |
| D384,319 S | 9/1997 | Harutiunian |
| 5,713,653 A | 2/1998 | White et al. |
| 5,716,653 A | 2/1998 | Simard et al. |
| 5,730,483 A | 3/1998 | Greger |
| 5,855,404 A | 1/1999 | Saunders |
| 5,856,779 A | 1/1999 | Friday |
| 5,856,976 A | 1/1999 | Hirano |
| 5,857,727 A | 1/1999 | Vetter |
| 5,860,405 A | 1/1999 | Muramatsu et al. |
| 5,869,907 A | 2/1999 | Marler |
| 6,068,075 A | 5/2000 | Saiki |
| 6,099,151 A | 8/2000 | Tlustos |
| 6,105,701 A | 8/2000 | Buell |
| 6,120,167 A | 9/2000 | Nace |
| 6,123,239 A | 9/2000 | Lovitt |
| 6,142,123 A | 11/2000 | Galasso et al. |
| 6,170,593 B1 | 1/2001 | Hatanaka |
| 6,254,166 B1 | 7/2001 | Willey |
| 6,276,482 B1 | 8/2001 | Moriya et al. |
| 6,293,606 B1 | 9/2001 | Jarosz et al. |
| D449,124 S | 10/2001 | Kamata et al. |
| 6,407,663 B1 | 6/2002 | Huggett |
| 6,409,783 B1 | 6/2002 | Miyajima et al. |
| 6,416,072 B1 | 7/2002 | Mochizuki et al. |
| 6,422,332 B1 | 7/2002 | Takata et al. |
| D465,181 S | 11/2002 | Wang |
| 6,491,193 B2 | 12/2002 | Dudek et al. |
| 6,502,884 B2 | 1/2003 | Shimazaki et al. |
| 6,505,877 B1 | 1/2003 | Devlin et al. |
| 6,543,831 B2 | 4/2003 | Takemura et al. |
| 6,581,711 B1 | 6/2003 | Tuluie |
| 6,585,072 B2 | 7/2003 | Scherbarth |
| 6,595,811 B2 | 7/2003 | Dagenais et al. |
| 6,619,415 B1 | 9/2003 | Hasumi et al. |
| 6,637,787 B1 | 10/2003 | Salvisberg |
| 6,641,196 B1 | 11/2003 | Hanagan |
| 6,666,503 B1 | 12/2003 | Sorensen |
| 6,679,347 B2 | 1/2004 | Iimuro |
| 6,691,814 B2 | 2/2004 | Toyoda |
| 6,695,088 B2 | 2/2004 | Schroeder |
| 6,695,330 B2 | 2/2004 | Hata |
| 6,707,377 B2 * | 3/2004 | Piper et al. .................. 340/427 |
| 6,709,042 B2 | 3/2004 | Takemura et al. |
| 6,719,179 B1 | 4/2004 | Webb, Jr. |
| 6,722,461 B2 | 4/2004 | Gogo |
| D490,038 S | 5/2004 | Macaluso |
| 6,748,569 B1 | 6/2004 | Brooke et al. |
| 6,756,697 B2 | 6/2004 | Mizutani et al. |
| 6,762,377 B2 | 7/2004 | Abrahamson |
| 6,783,040 B2 | 8/2004 | Batchelor |
| D495,982 S | 9/2004 | Ziehl |
| 6,786,625 B2 | 9/2004 | Wesson |
| 6,789,638 B2 | 9/2004 | Miyashiro |
| 6,792,966 B2 * | 9/2004 | Harvey ....................... 137/265 |
| 6,793,384 B2 | 9/2004 | Ban et al. |
| 6,796,030 B2 | 9/2004 | Mochizuki et al. |
| 6,806,590 B1 | 10/2004 | Smuk et al. |
| 6,823,958 B2 | 11/2004 | Domenicali et al. |
| 6,837,509 B2 | 1/2005 | Welch et al. |
| 6,840,344 B2 | 1/2005 | Galbraith et al. |
| 6,840,417 B2 | 1/2005 | Heinrich et al. |
| 6,860,353 B2 | 3/2005 | Miyashiro |
| 6,871,250 B2 | 3/2005 | Froeschl et al. |
| 6,896,278 B1 | 5/2005 | Hepburn |
| 6,898,656 B2 | 5/2005 | Griessbach et al. |
| 6,905,160 B2 | 6/2005 | Yoshida et al. |
| 6,910,704 B1 | 6/2005 | Celiceo et al. |
| 6,919,415 B2 | 7/2005 | Holmes et al. |
| 6,939,028 B2 | 9/2005 | Miyamoto |
| 6,951,417 B2 | 10/2005 | Ito et al. |
| 6,969,082 B2 | 11/2005 | Griffin et al. |
| 6,971,462 B2 | 12/2005 | Ito et al. |
| 7,011,174 B1 | 3/2006 | James |
| 7,033,209 B2 | 4/2006 | Swiatek et al. |
| 7,055,843 B2 | 6/2006 | Kan et al. |
| 7,073,525 B2 * | 7/2006 | Chung ......................... 137/38 |
| 7,077,230 B2 | 7/2006 | Arnold |
| 7,258,186 B2 * | 8/2007 | Okabe et al. ................. 180/219 |
| 7,264,072 B2 | 9/2007 | Yoshikawa et al. |
| 7,377,552 B2 * | 5/2008 | Miyabe ....................... 280/835 |
| 7,380,624 B2 | 6/2008 | Momosaki |
| 7,380,630 B2 * | 6/2008 | Yamada et al. .............. 180/230 |
| 7,384,055 B1 | 6/2008 | Halpern |
| 7,451,994 B2 | 11/2008 | Heitner |
| 2001/0035215 A1 * | 11/2001 | Tipton et al. ................. 137/571 |
| 2002/0040821 A1 | 4/2002 | Domenicali et al. |
| 2002/0042670 A1 | 4/2002 | Diaz et al. |
| 2002/0059075 A1 | 5/2002 | Schick et al. |
| 2002/0059728 A1 | 5/2002 | Mochizuki et al. |
| 2002/0108425 A1 | 8/2002 | Yanagibashi et al. |
| 2002/0171291 A1 | 11/2002 | Wayne et al. |
| 2002/0189878 A1 | 12/2002 | Iimuro |
| 2003/0063472 A1 | 4/2003 | Ban et al. |

| | | | |
|---|---|---|---|
| 2003/0097211 A1 | 5/2003 | Carroll et al. | |
| 2003/0105567 A1 | 6/2003 | Koenig et al. | |
| 2003/0161162 A1 | 8/2003 | Tracey | |
| 2004/0003153 A1 | 1/2004 | Froeschl et al. | |
| 2004/0080175 A1 | 4/2004 | Wegener et al. | |
| 2004/0130901 A1 | 7/2004 | Kashiwagi | |
| 2004/0154852 A1 | 8/2004 | Miyashiro et al. | |
| 2004/0170024 A1 | 9/2004 | Sheu et al. | |
| 2004/0206573 A1 | 10/2004 | Hsu | |
| 2004/0232183 A1 | 11/2004 | Watanabe et al. | |
| 2004/0262350 A1 | 12/2004 | Batchelor | |
| 2005/0000747 A1 | 1/2005 | Richlen et al. | |
| 2005/0051375 A1 | 3/2005 | Momosaki | |
| 2005/0066926 A1 | 3/2005 | Ishikawa et al. | |
| 2005/0174787 A1 | 8/2005 | Uemoto et al. | |
| 2005/0204856 A1 | 9/2005 | Clark | |
| 2005/0206122 A1 | 9/2005 | Ichihara et al. | |
| 2005/0247287 A1 | 11/2005 | Kondo et al. | |
| 2005/0253359 A1 | 11/2005 | Egan | |
| 2006/0061062 A1 | 3/2006 | Buell et al. | |
| 2006/0090945 A1 | 5/2006 | Ishida et al. | |
| 2007/0007065 A1 | 1/2007 | Iizuka et al. | |
| 2007/0050095 A1 | 3/2007 | Nelson et al. | |
| 2007/0107968 A1 | 5/2007 | Iwanaga | |
| 2007/0181360 A1 | 8/2007 | Nakayama | |
| 2007/0199754 A1* | 8/2007 | Okuma et al. | 180/218 |
| 2008/0190683 A1 | 8/2008 | Hoeve | |

FOREIGN PATENT DOCUMENTS

| | | |
|---|---|---|
| EP | 0723892 A2 | 7/1996 |
| EP | 0978433 A2 | 2/2000 |
| EP | 1 515 037 | 3/2005 |
| FR | 1 111 887 A | 3/1956 |
| GB | 19436 A | 10/1912 |
| JP | 59 106380 A | 6/1984 |
| JP | 2003-291873 * | 10/2003 |
| JP | 2004 352144 | 12/2004 |
| WO | WO2008088809 | 7/2008 |

OTHER PUBLICATIONS www.harley-davidson.com—2007 Dyna Wide Glide—Fat Bob Fuel Tanks, Jan. 17, 2007.*

Sport Rider Online Magazine; 2005 BMW K1200S, www.sportrider.com/bikes/2005/146_05_bmw_kl2s; printed Jun. 30, 2005, 5 pages.

2004 Engine Review—Volve Penta; www.powerandmotoryacht.com/engines/0104preview/index.html; printed Jun. 30, 2005, 2 pages.

Overall Concept and Model Features; BMW Motorrad Media Release, www.motorcycles.bmw.com.au/scripts/main.asp, (Jul. 14, 2004); printed Jul. 8, 2005, 3 pages.

BMW Media Releases; www.motorcycles.bmw.com/au/scripts/main.asp, printed Jul. 8, 2005, 1 page.

BMW of Santa Cruz On-Line Article, Electrics and Electronics, www.bmwscruz.com/motorcycles/K1200S/K1200S_F4.html; printed Jul. 8, 2005, 3 pages.

BMW Motorrad Article, Single Wire System and CAN bus, www.bmw-motorrad.com/technology, printed Jul. 8, 2005, 1 page.

BMW Focus on Technology article on Single Wire system and CAN bus, www.bmw-motorrad.com/com/en/services/techniquedetail/print_view/can_bus.html, printed Jul. 8, 2005, 2 pages.

John Valk BMC Article—The New BMW R 1200 RT, www.johnvalkbmw.ca/2005/BMW/R1200RT/General-R1200RT-More.htm; printed Jul. 8, 2005, 11 pages.

BMW Motorrand of South Africa; The Motorcycles, R1200GS SA Road Test, www.bmwmotorrad.co.za/bikes/tests/display.asp?Id=100, (Feb. 2004 ed.); printed Jul. 8, 2005, 3 pages.

Sport Rider Online Magazine; 2005 BMW K1200S, www.sportrider.com/bikes/2005/146_05_bmw_k12s_electronics; printed Aug. 31, 2005, 4 pages.

Yamaha Road Star (available at least before Jan. 17, 2007), 1 page.

BMW K12OOTL, (available at least before Jan. 17, 2007), 1 page.

Harley Davidson catalog—Electra Glide (available at least before Jan. 17, 2007), 1 page.

Harley Davidson Road King Classic leather tour pak (available at least before Jan. 17, 2007), 1 page.

Harley Davidson Road Glide (available at least before Jan. 17, 2007), 1 page.

International Search Report and Written Opinion for PCT/US2008/000536 issued by the European Patent Office on August 27, 2008.

Patial translation of German Patent DE 11 18 632 B, 2 pgs.

* cited by examiner

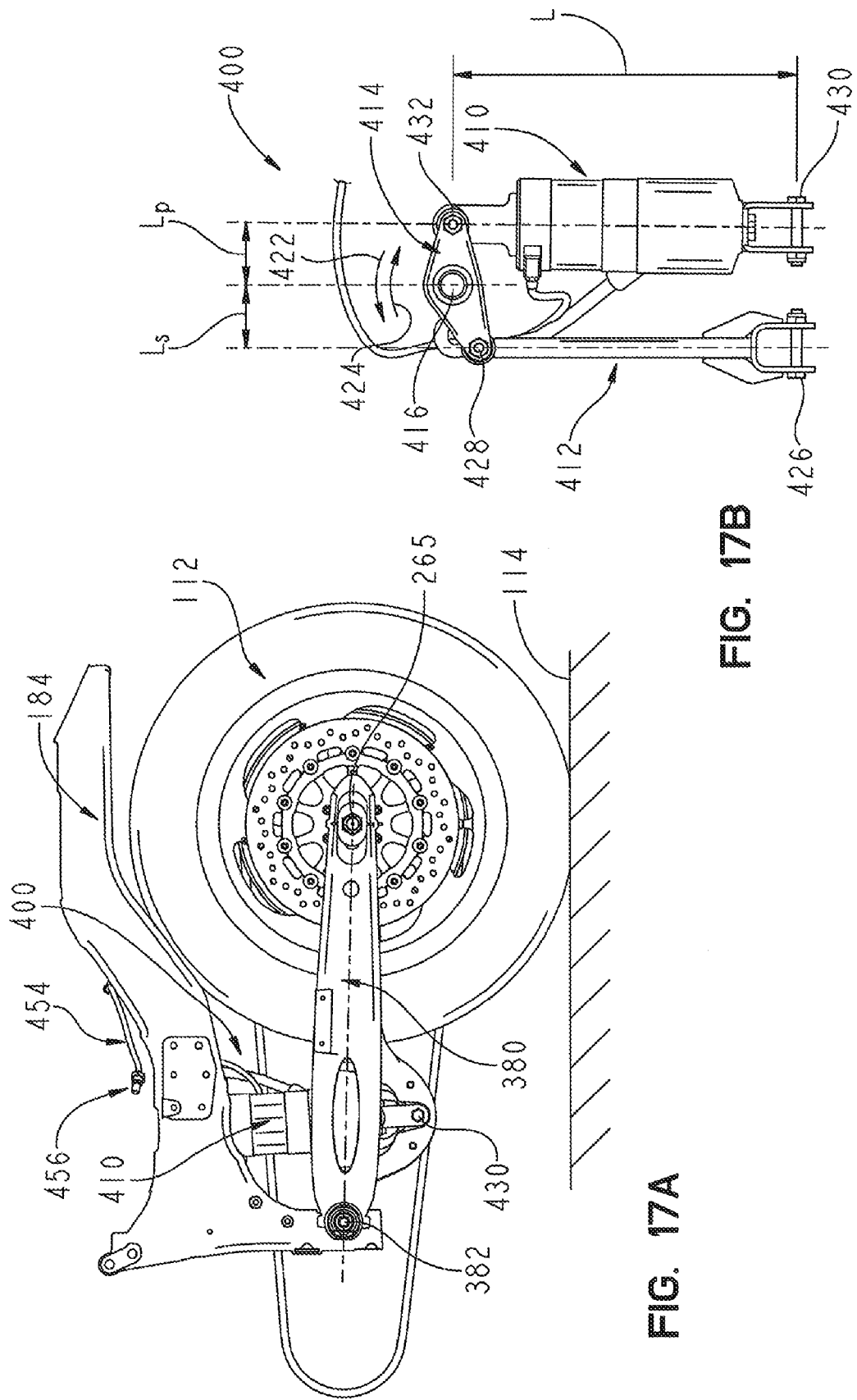

FUEL TANK ARRANGEMENT FOR A VEHICLE

CROSS-REFERENCE TO RELATED APPLICATIONS

This application relates to U.S. patent application Ser. No. 11/624,142 filed Jan. 17, 2007, titled "REAR SUSPENSION FOR A TWO WHEELED VEHICLE," U.S. patent application Ser. No. 11/624,144 filed Jan. 17, 2007, titled "TIP OVER STRUCTURE FOR A TWO WHEELED VEHICLE," and U.S. Provisional Patent Application Ser. No. 60/880,909 filed Jan. 17, 2007, titled "TWO-WHEELED VEHICLE", the disclosures of which are expressly incorporated by reference herein.

FIELD OF THE INVENTION

The present invention relates generally to a vehicle and in particular to a motorcycle.

BACKGROUND OF THE INVENTION

Two wheel vehicles, such as motorcycles, are known. It is known to include a fuel storage tank on a motorcycle. It is known to provide a rear suspension for a motorcycle. It is known to include devices on a motorcycle to minimize damage during a tip-over of the motorcycle.

SUMMARY OF THE INVENTION

The present disclosure relates to two wheeled vehicles, including motorcycles. The present disclosure relates to the placement of various components to move the center of gravity of a two-wheeled vehicle forward. The present disclosure relates to the configuration of fuel storage tanks of a two-wheeled vehicle. The present disclosure relates to apparatus to prevent an unwanted tip-over of a two-wheeled vehicle.

In an exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; a swingarm pivotably coupled to the frame and supported by the rear wheel; a suspension system coupled to the swing arm and to the frame. The suspension system including a shock absorber and a linkage coupled to the shock absorber. The linkage moves in a plane which is transverse to the longitudinal plane of the two-wheeled vehicle.

In another exemplary embodiment of the present invention, a two-wheeled vehicle is provided. The two-wheeled vehicle comprising a front wheel; a rear wheel generally in positioned in line with the front wheel along a longitudinal plane of the two-wheeled vehicle; a frame supported by the front wheel and the rear wheel; a swingarm pivotably coupled to the frame at a first location and supported by the rear wheel; a suspension system coupled to the frame at a second location. The second location being higher than the first location. The suspension system being further coupled to the swingarm. The two-wheeled vehicle further comprising an exhaust system coupled to the engine. The exhaust system extending rearward from the engine towards the rear wheel and passing in front of the rear wheel from a first side of the two-wheeled vehicle to a second side of the two-wheeled vehicle at a height lower than the first location.

In a further exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; an engine coupled to the frame and operably coupled to the rear wheel to power the rear wheel; a steering assembly coupled to the front wheel, the steering assembly being moveable to steer the front wheel; and a fuel storage tank supported by the frame and operably coupled to the engine. The steering assembly including an upper portion above a top horizontal plane of fuel storage tank and a lower portion below a bottom horizontal plane of the fuel storage tank. The lower portion being coupled to the upper portion through a middle portion, at least a portion of the middle portion being positioned rearward of a front vertical plane of the fuel storage tank.

In yet another exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; an engine coupled to the frame and operably coupled to the rear wheel to power the rear wheel; a steering assembly coupled to the front wheel, the steering assembly being moveable to steer the front wheel; and a plurality of fuel storage tanks supported by the frame and operably coupled to the engine. A first fuel storage tank and a second fuel storage tank of the plurality of fuel storage tanks being positioned forward of the rear wheel and in a generally side-by-side configuration.

In still another exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; an engine coupled to the frame and operably coupled to the rear wheel to power the rear wheel, the engine being positioned between the front wheel and the rear wheel; a straddle seat supported by the frame, the straddle seat having a support surface; and a battery operably coupled to the engine. The battery located generally forward of the engine.

In yet a further exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; an engine coupled to the frame and operably coupled to the rear wheel to power the rear wheel; a straddle seat supported by the frame, the straddle seat having a support surface; a storage compartment supported by the frame and positioned proximate to the rear wheel. The storage compartment being positioned laterally outward of the rear wheel and overlapping a portion of the rear wheel from a direction normal to the longitudinal plane. The two-wheeled vehicle further comprising an at least one support member positioned to support the two-wheeled vehicle to prevent damage to an exterior of the storage compartment in the event of the two-wheeled vehicle unintentionally tipping. The at least one support member being positioned in a non-overlapping relationship with the storage compartment.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 17A is a side view of the assembly of FIG. 13 with the rear suspension being in a mid-travel state;

FIG. 17B illustrates the rear suspension in the mid-travel state corresponding to FIG. 17A;

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a touring motorcycle, it should be understood, that the invention may have application to other types of vehicles such as all-terrain vehicles, motorcycles, watercraft, utility vehicles, scooters, golf carts, and mopeds.

Figure 1:
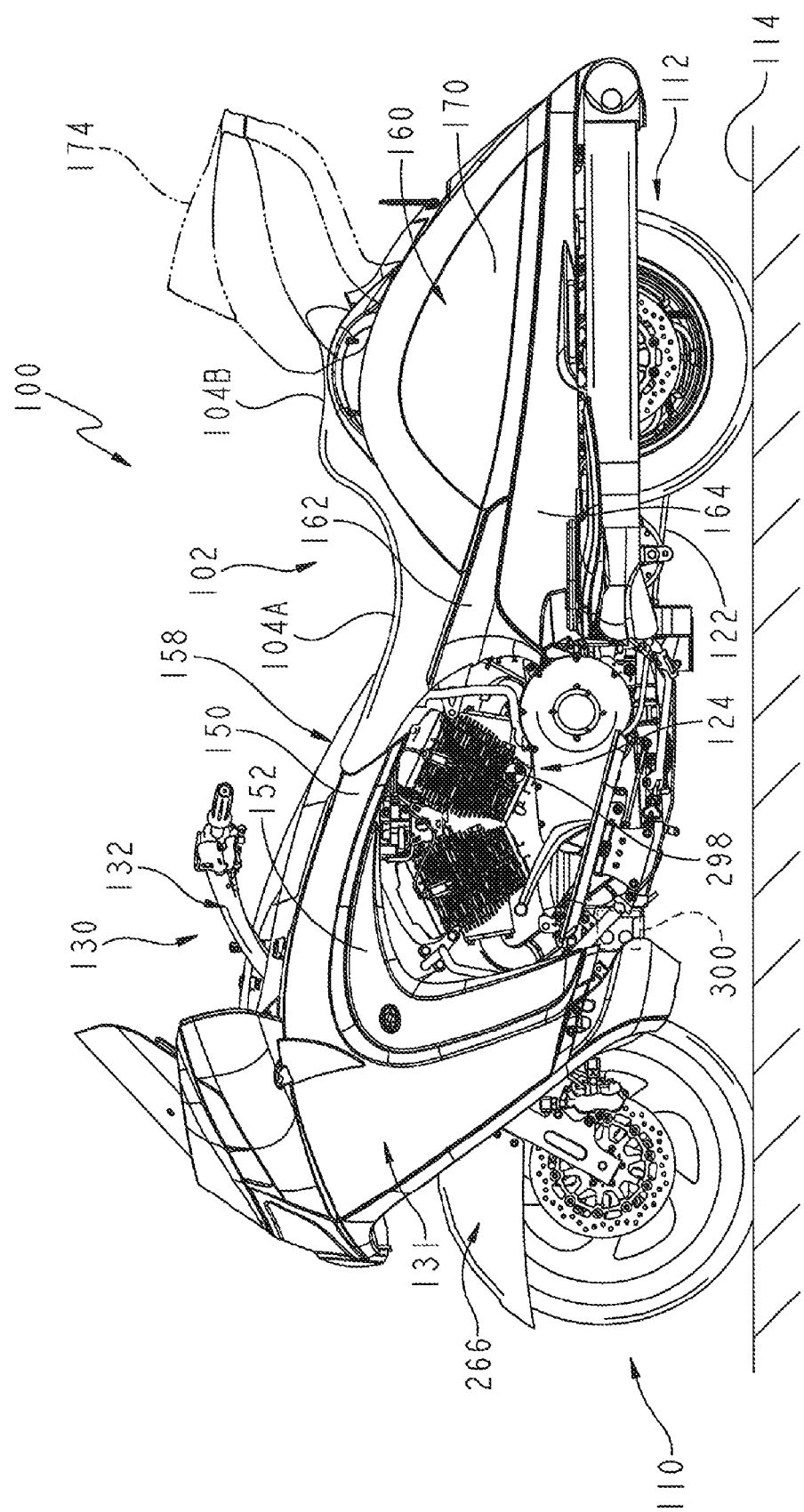
FIG. 1 is a side view of an illustrative embodiment of a two-wheeled vehicle.

Referring to FIG. 1, an illustrative embodiment of a two-wheeled vehicle 100 is shown. Vehicle 100 as illustrated is a touring motorcycle including a seat 102 for supporting an operator in position 104A and a passenger in position 104B. Additional details about vehicle 100 are disclosed in U.S. Provisional Patent Application Ser. No. 60/880,909, , filed Jan. 17, 2007, titled "TWO-WHEELED VEHICLE", the disclosure of which is expressly incorporated by reference herein.

Vehicle 100 further includes a front ground engaging member, illustratively wheel 110, and a rear ground engaging member, illustratively wheel 112. Vehicle 100 travels relative to the ground 114 on front wheel 110 and rear wheel 112. In one embodiment, front wheel 110 and rear wheel 112 are generally arranged along a centerline plane 116 (see FIG. 4) of vehicle 100.

Rear wheel 112 is coupled to a drive shaft of a transmission through a belt 122. Transmission is coupled to engine 124 which provides power to rear wheel 112. In the illustrated embodiment, engine 124 is a 100 cubic inch 4-stroke 50° v-twin spark-ignition gasoline engine available from Polaris Industries, Inc. located at 2100 Highway 55 in Medina, Minn. 55340. In one embodiment, engine 124 has a maximum width of about 380 millimeters or approximately 15 inches which allows flexibility and comfort for the position of the operator's legs. In alternative embodiments, rear wheel 104 is coupled to the drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuous variable transmission.

It will be appreciated that while the vehicle 100 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Front wheel 110 is coupled to a steering assembly 130. Steering assembly 130 includes handlebars 132 which may be moved by an operator to rotate front wheel 110 either to the left or the right.

Engine 124 is framed by various bodywork components. A front portion of vehicle 100 includes a front fairing 131 having a central opening 134 (see FIG. 3). Steering assembly 130 extends through central opening 134. Front fairing 131 is stationary and does not move left or right with steering assembly 130.

Figure 3:
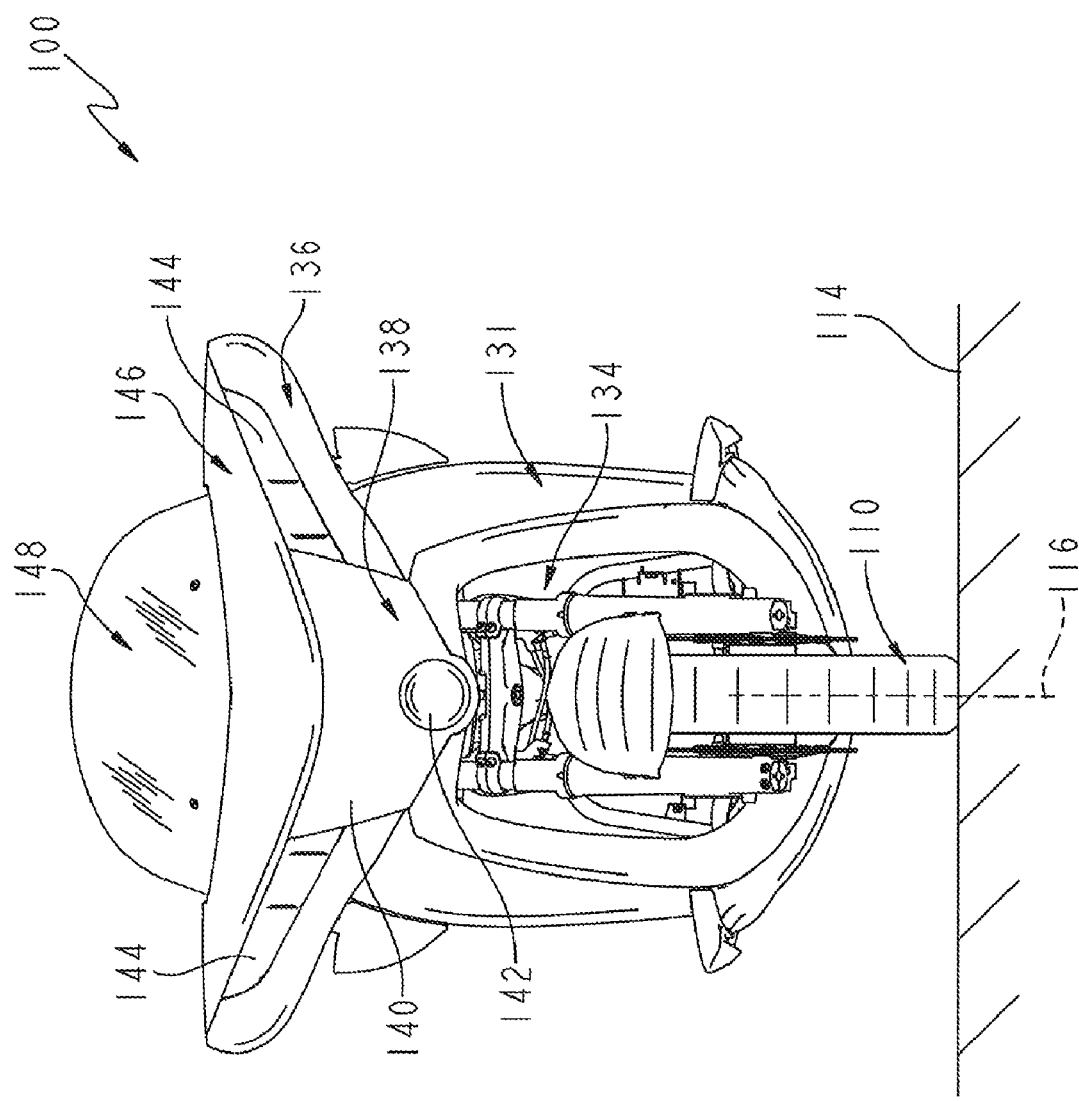
FIG. 3 is a front view of the two-wheeled vehicle of FIG. 1.

Referring to FIG. 3, a front panel 136 is provided which frames the front light assembly 138 including a front driving light assembly 140, a high beam light 142, and turn lights 144.

Front panel 136 further includes an access panel 146 above which windshield 148 extends.

Returning to FIG. 1, front fairing 131 includes a side panel 150 which extends from in front of a lower portion of engine 124 up above engine 124 and over engine 124 back to seat 102. A second panel 152 follows the general line of side panel 150 and is set inward of side panel 150. Additionally, a top bodywork grouping 158 covers a top portion of vehicle 100 generally forward of seat 102.

Figure 4:
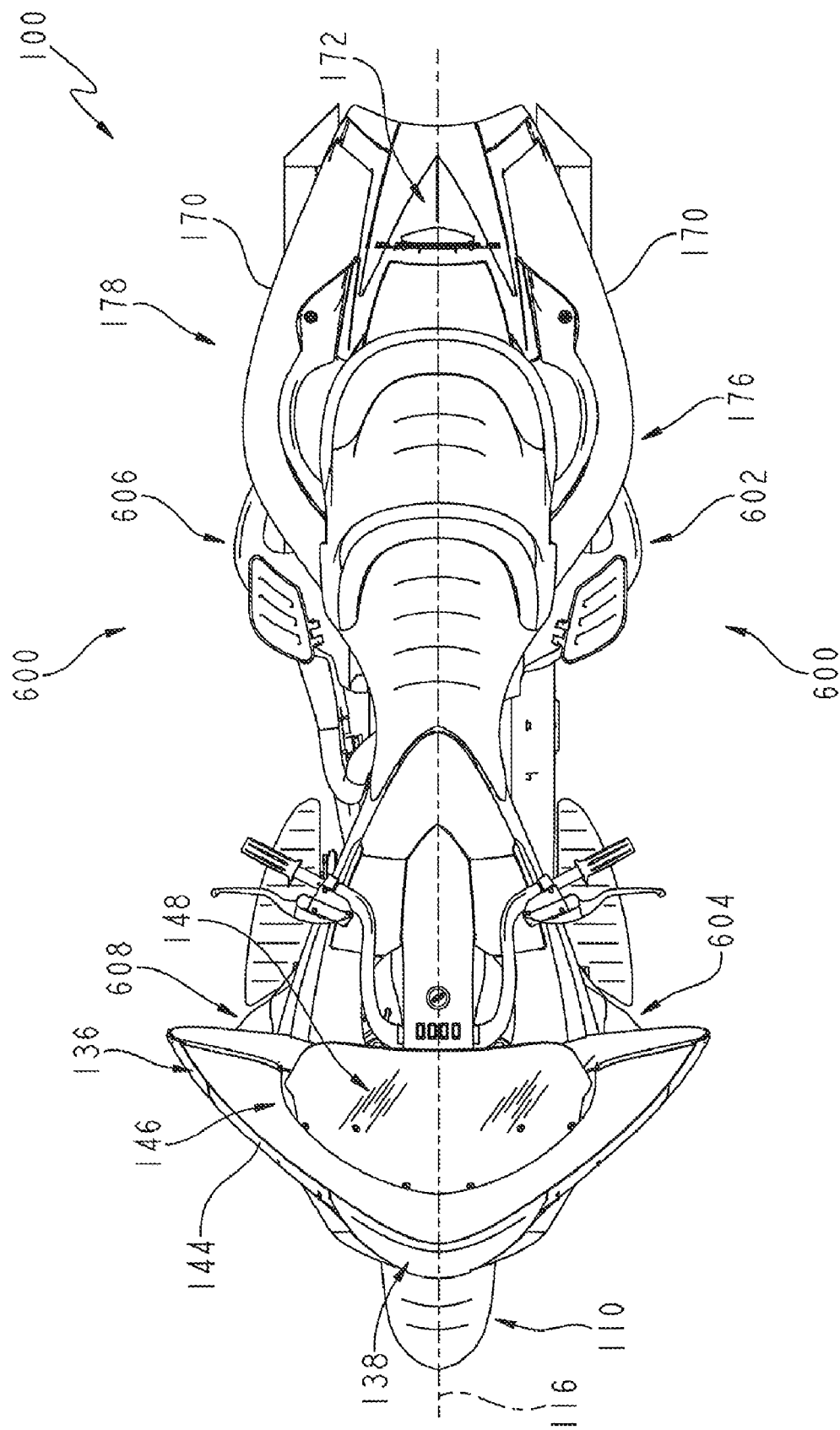
FIG. 4 is a top view of the two-wheeled vehicle of FIG. 1.
Figure 13:
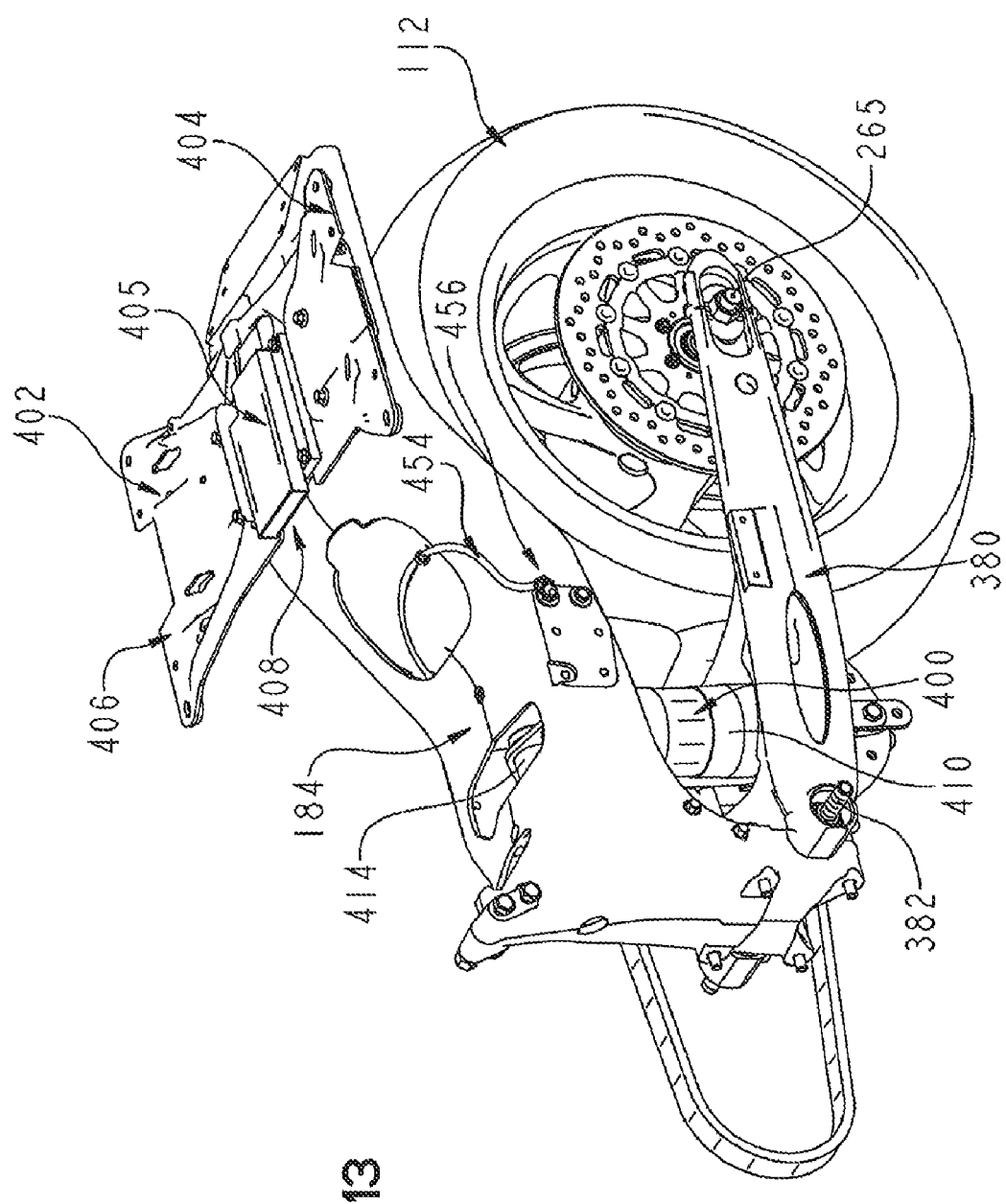
FIG. 13 is a perspective view of a rear suspension coupled to the rear frame member and the rear swingarm of FIG. 5, the rear swingarm being further coupled to a rear wheel.
Figure 13A:
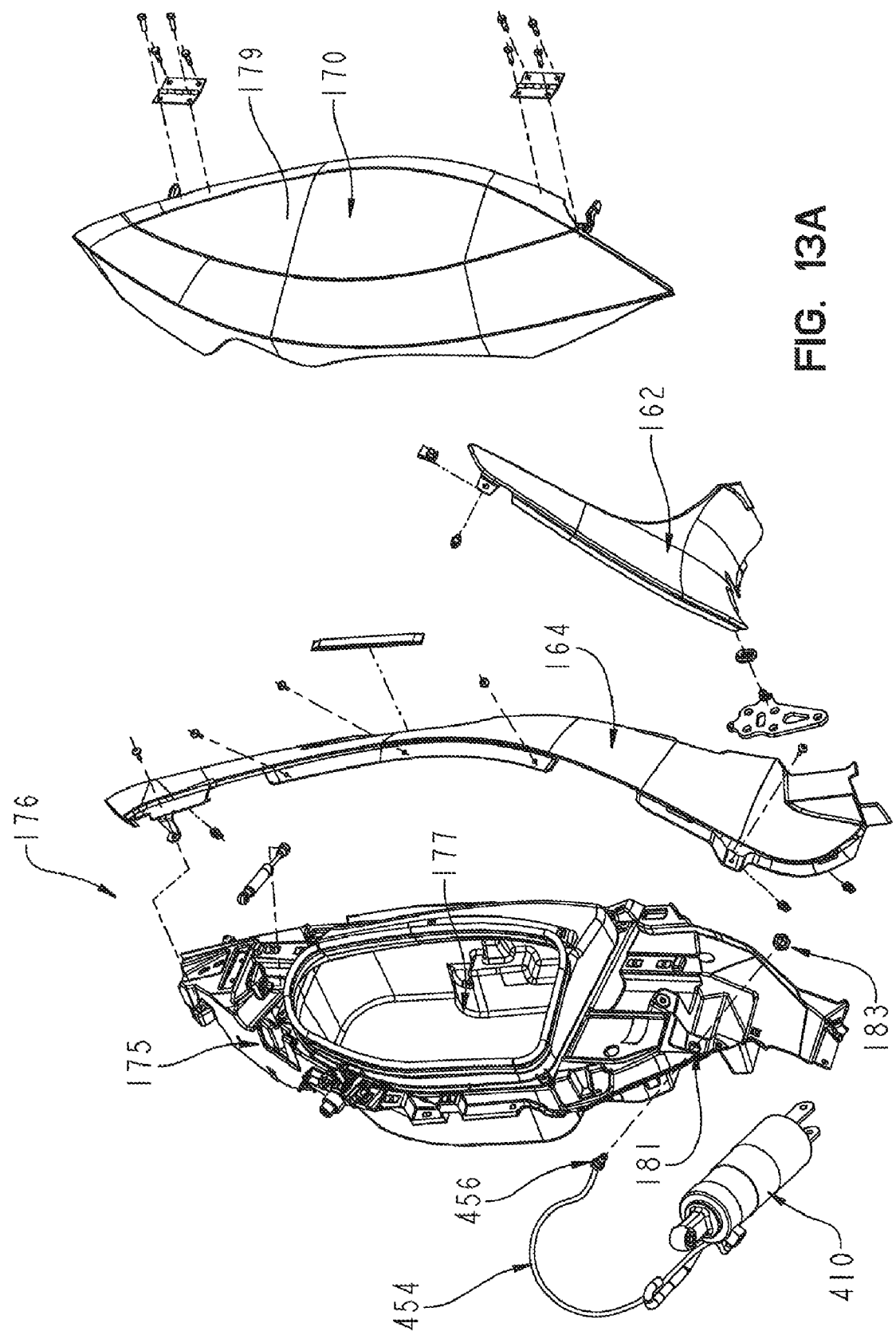
FIG. 13A is an exploded view of portions of the rear bodywork illustrating the location that the air line coupled to the rear suspension of FIG. 13 is accessible.

A rear portion of vehicle 100 includes a rear bodywork grouping 160. Rear bodywork grouping 160 includes side panels 162 and 164. Further, rear bodywork grouping 160 includes an exterior of saddlebags 170, a rear panel 172 (see FIG. 4), and a removable trunk 174. Referring to FIG. 4, vehicle 100 includes a left side saddlebag 176 and a right side saddlebag 178. Saddlebags 176, 178 and trunk 174 are each storage compartments supported by the frame and positioned proximate to the rear wheel. As shown in FIG. 13A, saddlebag includes a base member 175 which includes a storage compartment 177. Storage compartment 177 is covered by a saddlebag cover 179 which is movable between an opened position and a closed position. Saddlebags 176, 178 are positioned laterally outward of the rear wheel and overlapping a portion of the rear wheel from a direction normal to the longitudinal plane 116. Trunk 174 is positioned above the support surface of the straddle seat 102.

Figure 5:
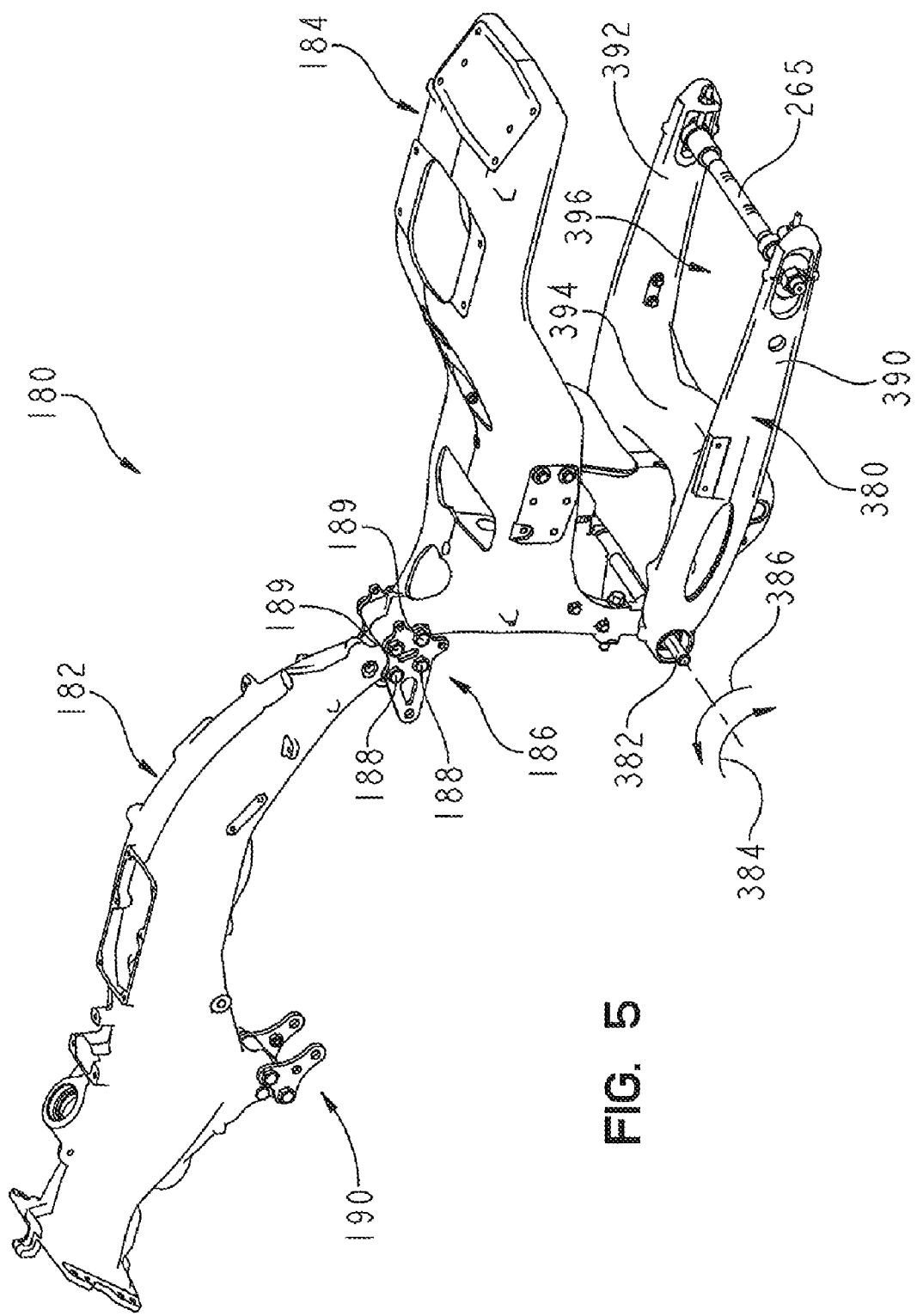
FIG. 5 is an perspective view of a rear swingarm and a chassis of the two-wheeled vehicle of FIG. 1, the chassis including a front frame member and a rear frame member.

Turning to FIG. 5, vehicle 100 includes a chassis 180. Chassis 180 includes a front frame member 182 and a rear frame member 184. In one embodiment, both front frame member 182 and rear frame member 184 are cast one-piece components. In one example, the front frame member 182 and the rear frame member 184 are cast aluminum. By casting front frame member 182 and rear frame member 184, variances in component attachment points from instance to instance of a given chassis is reduced compared to traditional tubular frames. In one embodiment, component attachment points are machined to achieve improved tolerancing. In addition, the torsional stiffness of vehicle 100 is generally about twice as stiff as a tubular frame vehicle.

Front frame member 182 and rear frame member 184 are coupled together. In the illustrated embodiment, both front frame member 182 and rear frame member 184 are coupled to mounting brackets 186, front frame member 182 through couplers 188 and rear frame member through couplers 189. Mounting brackets 186 along with mounting brackets 190 couple to engine 124 such that engine 124 is suspended from front frame member 182.

By having front frame 182 and rear frame 184 as separate components coupled together, either front frame 182 or rear frame 184 may be used on another type of two-wheeled vehicle thereby reducing design cycles and part cost.

Figure 6:
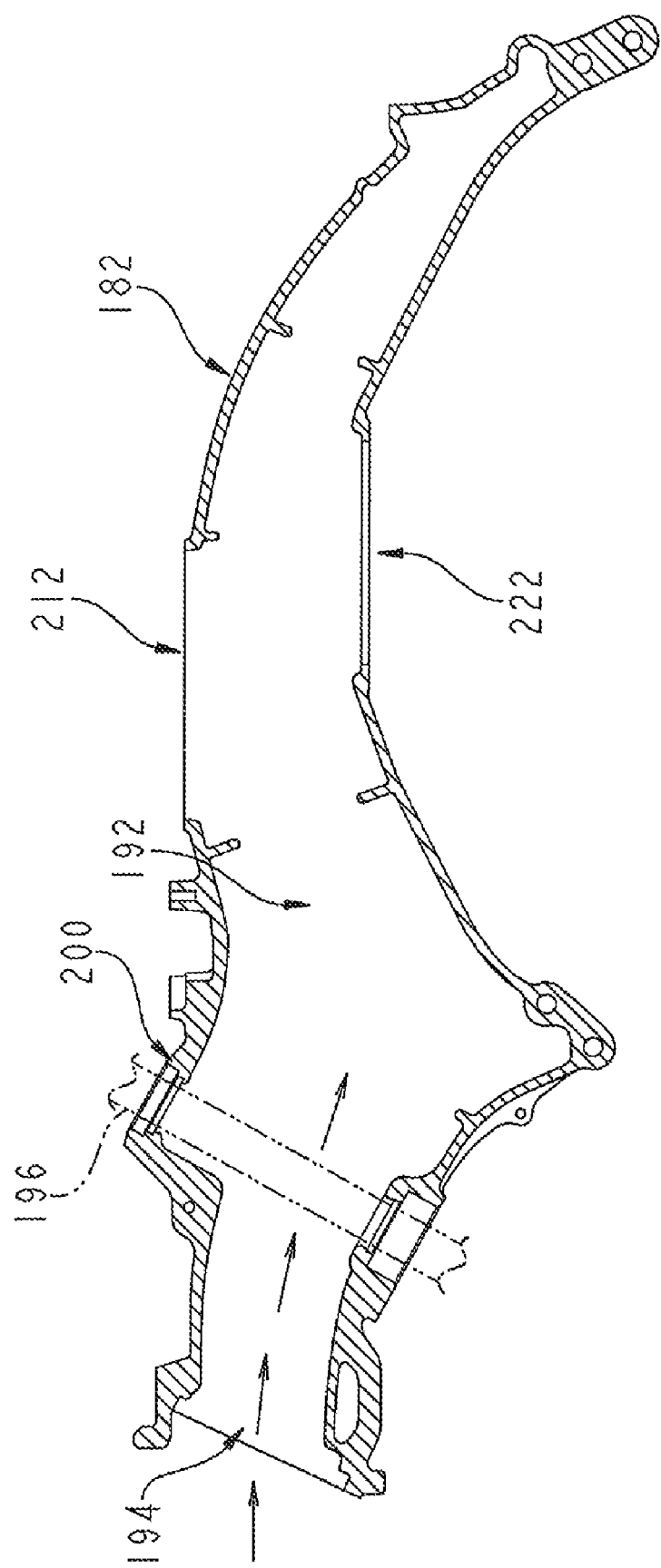
FIG. 6 is a sectional view of the front frame member of the chassis of FIG. 5.

Front frame member 182 includes an air channel 192 within as shown in FIG. 6. Front frame member 182 serves as an air box for vehicle 100. Referring to FIG. 6, air enters an air inlet 194 located in the front of front frame member 182, passes around a steering column 196 of steering assembly 130, and exits through an air outlet 222 of front frame member 182. The air outlet 222 is in fluid communication with engine 124 and communicates air to engine 124. The steering column 196 of steering assembly 130 passes through a fork journal 200 of front frame member 182. Sealed bearings are pressed into a top portion 197 and a bottom portion 199 of fork journal 200 and facilitate the rotation of steering column 196 relative to front frame member 182.

Figure 7:
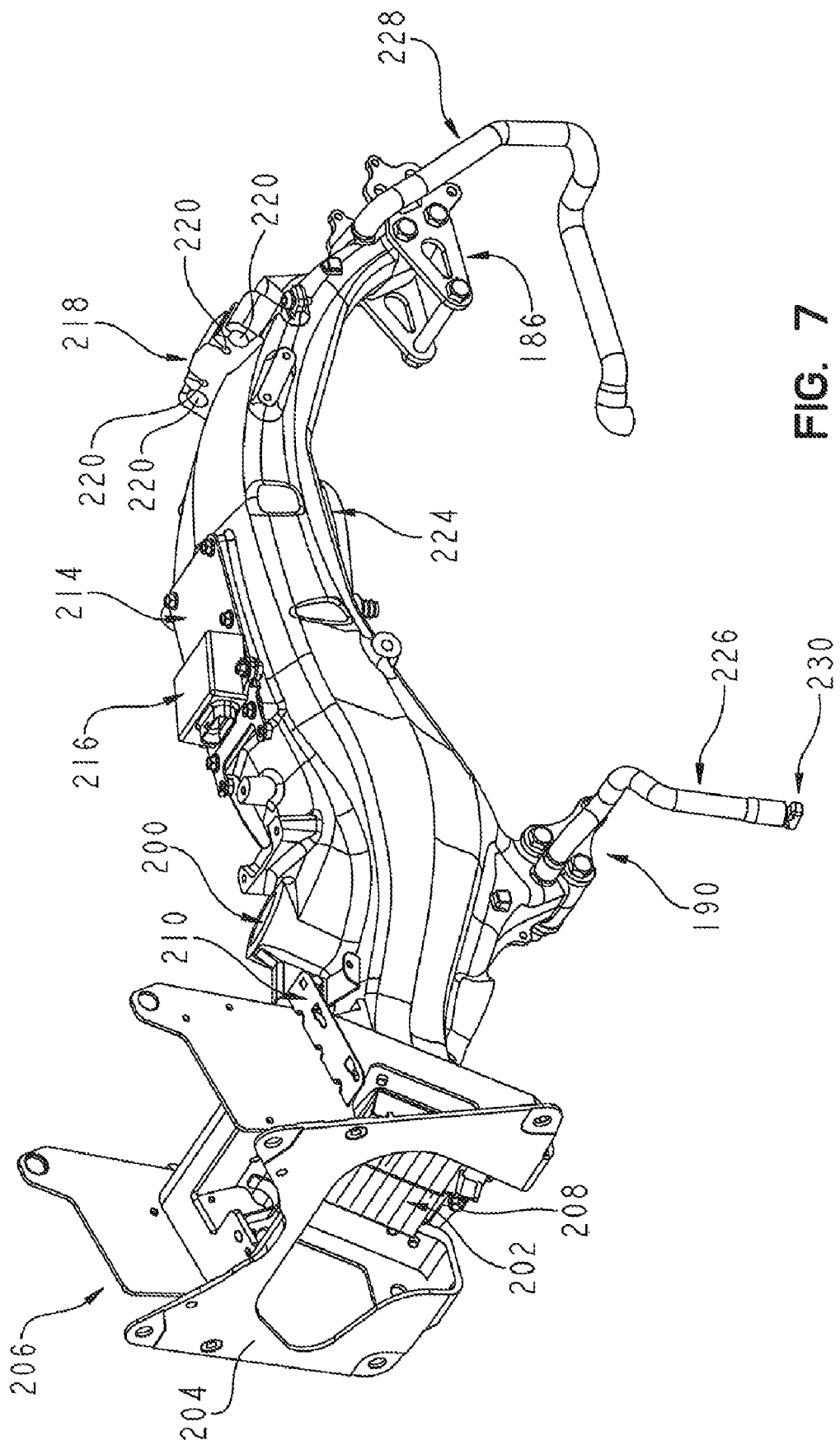
FIG. 7 is an perspective view of the front frame member of FIG. 6 with an air filter, mounting bracket, an electronic module, and a harness management member coupled thereto.

Referring to FIG. 7, an air filter 202 is positioned over air inlet 194 so that air passes through air filter 202 and into the interior 192 of front frame member 182 on its way to engine 124. Referring to FIG. 3, air enters opening 134 between front wheel 110 and fairing 131. This results in introducing cool air into the air box and ultimately into engine 124.

Air filter 202 is located behind the headlight assembly 138 (see FIG. 3) which mounts to a front portion 204 of a mounting bracket 206 coupled to front frame member 182. By placing air filter 202 up front, air filter 202 is easily accessible for servicing. In the illustrated embodiment, air filter 202 is held in place through two couplers 208 (one shown), illustratively fasteners. To replace air filter 202 couplers 208 are removed and air filter 202 may slide down out of place. Once removed from air inlet 194 a replacement air filter 202 may be installed by re-securing couplers 208.

Mounting bracket 206 along with supporting light assembly 138, supports many other components including front panel 136, access panel 146, windshield 148, and additional components including an instrument panel and rear view mirrors. In addition, mounting bracket 206 has coupled thereto a mounting bracket 210 to which a fuse box (not shown) may be coupled. A similar mounting bracket is positioned on the left side of mounting bracket 206 to mount a similar fuse box. By locating the fuse box proximate to mounting bracket 206, an operator may easily replace a fuse by removing access panel 146 to gain access to the fuse box.

An upper access opening 212 (see FIG. 6) of front frame member 182 is covered with a cover 214 secured with multiple fasteners. Cover 214 also supports an electronic module 216 which interfaces with the turn signals to act as an auto cancellation module in case the turn signals are inadvertently left on. Harnesses extending rearward from electronic module 216 and/or additional components are organized by harness management member 218 having a plurality of channels 220 to maintain various harnesses in a spaced apart arrangement.

Air outlet 222 (see FIG. 6) of front frame member 182 is connected with a seal 224 that is in fluid communication with engine 124 and communicates air to engine 124. Also, in fluid communication with interior 192 of front frame member 182 is a drain hose 226 coupled to a front port of front frame member 182 and a crankcase breather hose 228 coupled to a rear port of front frame member 182. Drain hose 226 is capped with a drain plug 230. Drain hose 226 is used to drain any fluids that may have accumulated within the air box. Crankcase breather hose 228 is used to reduce pressure build-ing up in the crankcase by transferring gases, such as oil vapor and/or hydrocarbons, back to the intake system.

Figure 8:
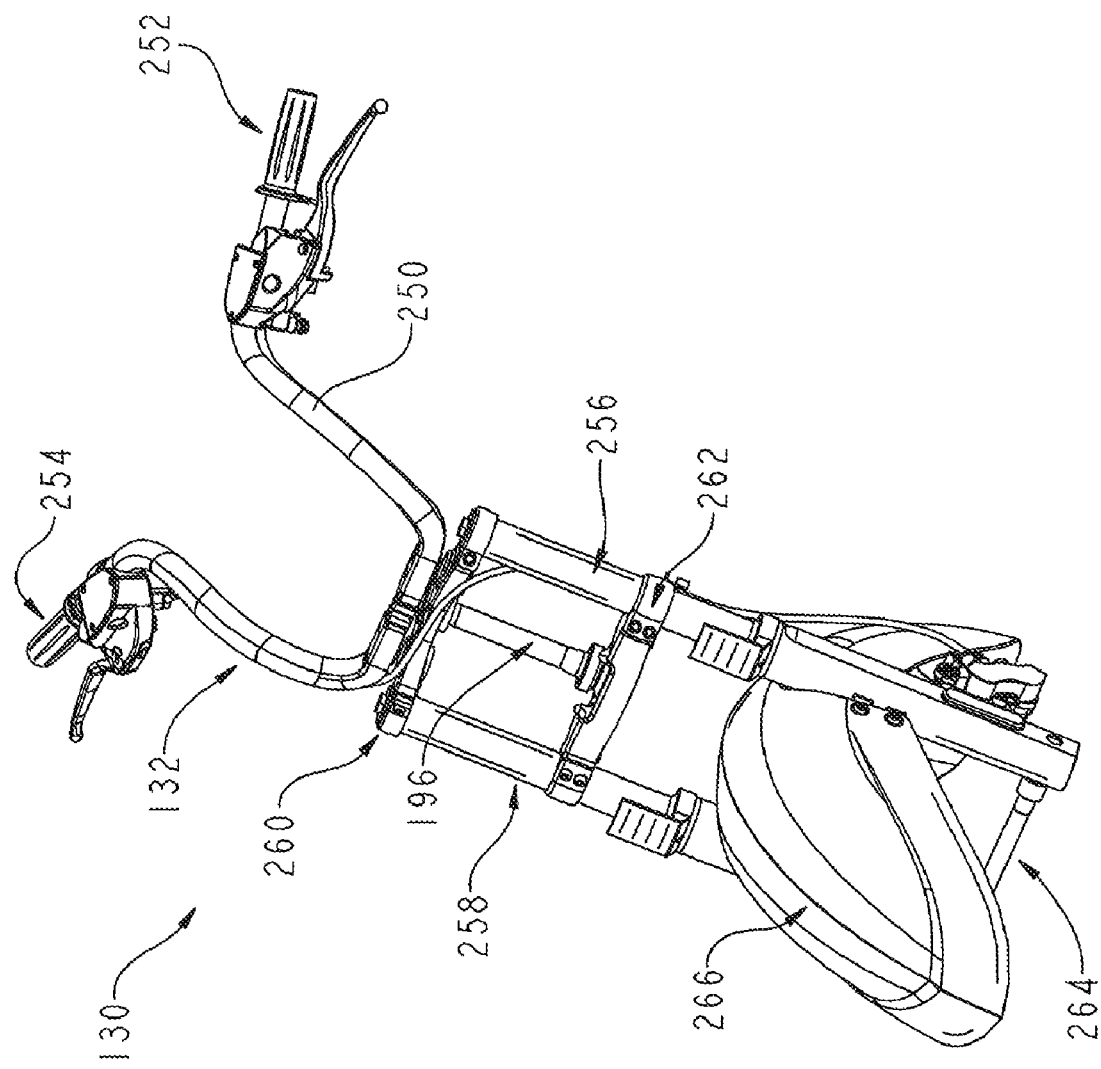
FIG. 8 is a perspective view of the steering assembly of the two-wheeled vehicle of FIG. 1.

Referring to FIG. 8, steering assembly 130 is shown. Steering assembly 130 includes handlebars 132 which include a handlebar member 250 and a left and right grip 252, 254. As is known in the art, each of left grip 252 and right grip 254 may be configured to control and/or have associated therewith one or more components to control engine 124, the transmission and/or the front and/or rear brakes of two-wheeled vehicle 100. As shown in FIG. 8, handlebars 132 are coupled to center steering column 196 and left and right steering columns 256, 258 through an upper bracket 260.

Center steering column 196 passes through fork journal 200 in front frame member 182. Left and right steering columns 256, 258 are positioned to a left side and a right side of front frame member 182, respectively. As used herein, the left side corresponds to a left side of an operator straddling seat 102 facing forward and the right side corresponds to a right side of an operator straddling seat 102 facing forward.

A lower bracket 262 also couples center steering column 196 and left and right steering columns 256, 258 together. Upper bracket 260 is positioned above front frame member 182 and lower bracket 262 is positioned below front frame member 182. Left and right steering columns 256, 258 are coupled to front wheel 110 through an axle 264. Further, a fender 266 is coupled to left and right steering columns 256, 258 and positioned over front wheel 110.

Figure 10:
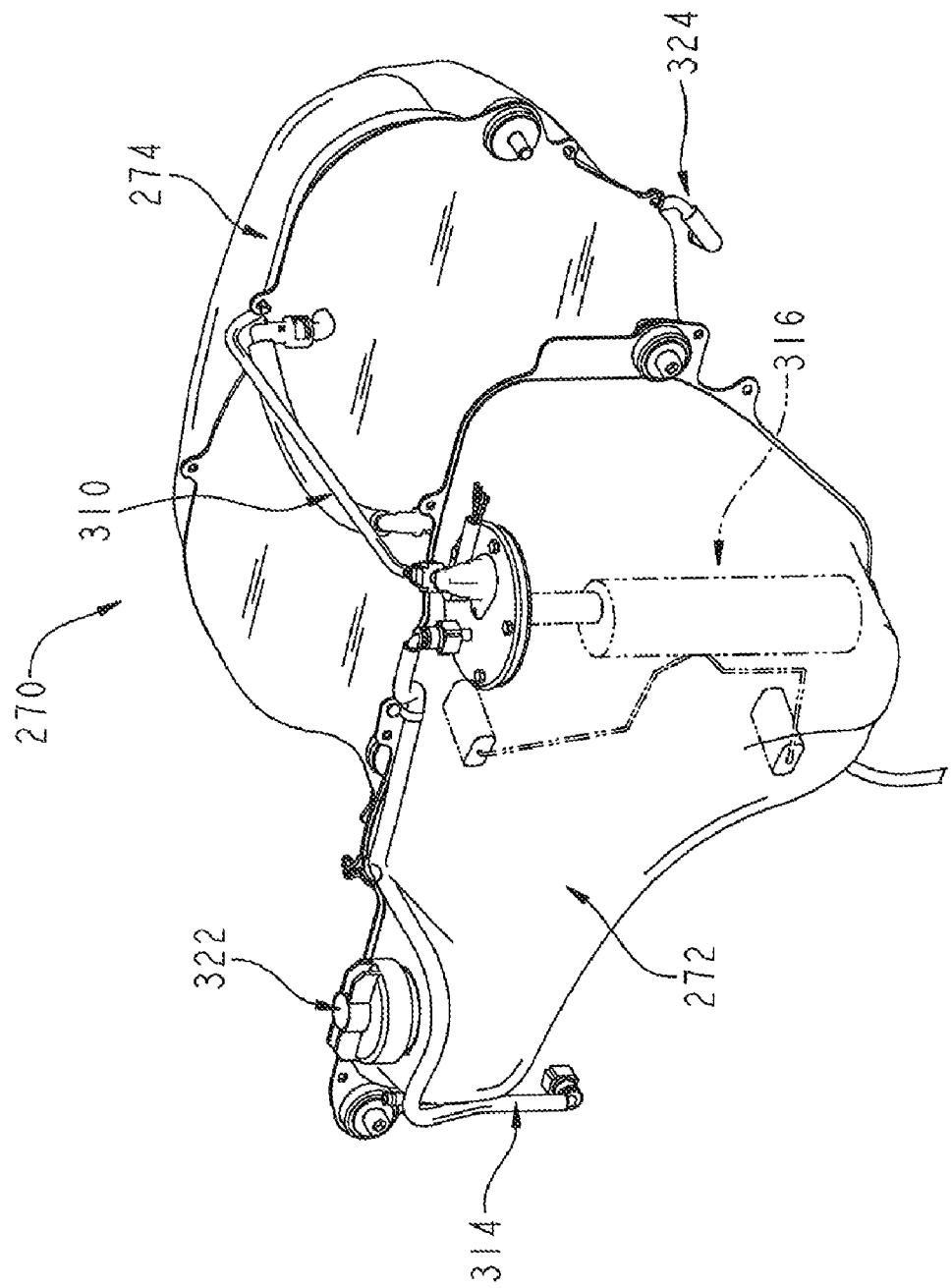
FIG. 10 is a perspective view of two fuel storage tanks of the two-wheeled vehicle of FIG. 1.

In one embodiment, a portion of steering assembly 130 is positioned rearward of a forward portion of at least one fuel storage tank (fuel storage tank 272 illustrated) of two-wheeled vehicle 100. Referring to FIG. 10, in one embodiment, two-wheeled vehicle 100 includes a fuel storage system 270 which includes two fuel storage tanks, fuel storage tank 272 and fuel storage tank 274. Additional details about fuel storage system 270 are provided herein.

Returning to FIG. 9, a portion of steering assembly 130 is positioned rearward of a forward portion of fuel storage tank 272 of fuel storage system 270. Steering assembly 130 may be divided into three portions, a bottom portion 276, a middle portion 278, and a top portion 280. Bottom portion 276 of steering assembly 130 is the portion of steering assembly 130 which extends below a bottom plane 282 of fuel storage tank 272. Bottom plane 282 of the fuel storage tank is a horizontal plane passing through the lowermost point of fuel storage tank 272. Top portion 280 of steering assembly 130 is the portion of steering assembly 130 which extends above a top plane 284 of fuel storage tank 272. Top plane 284 of fuel storage tank 272 is a horizontal plane passing through the uppermost point of fuel storage tank 272. Middle portion 278 of steering assembly 130 is the portion of steering assembly 130 which is between bottom plane 282 of fuel storage tank 272 and top plane 284 of fuel storage tank 272.

Figure 9:
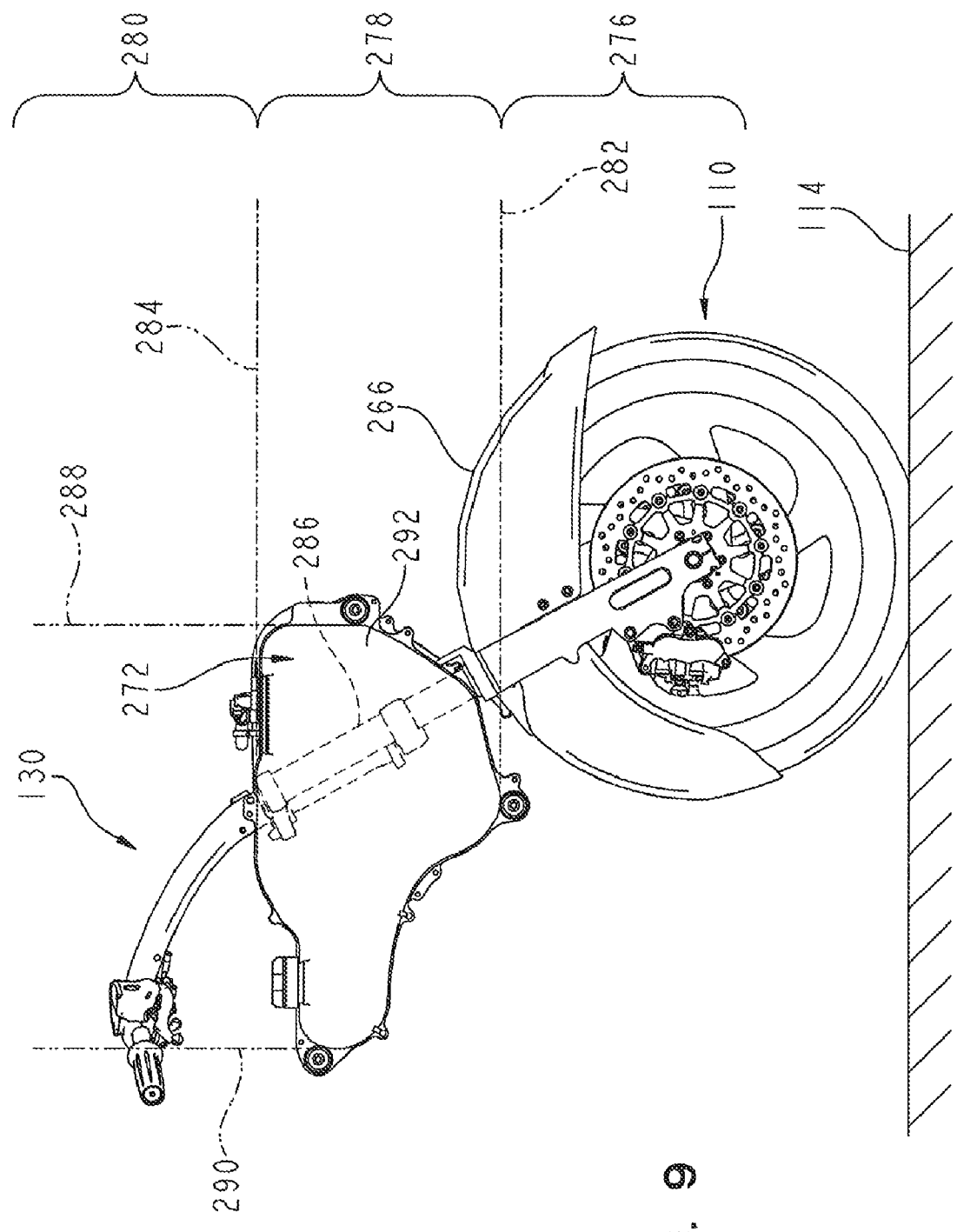
FIG. 9 illustrates the placement of a fuel storage tank relative to the steering assembly of FIG. 8.

As illustrated in FIG. 9, bottom portion 276 of steering assembly 130 is coupled to top portion 280 of steering assembly 130 through middle portion 278. Middle portion 278 has at least a portion 286 thereof which is positioned rearward of a front plane 288 of fuel storage tank 272. Further, portion 286 of middle portion 278 is positioned forward of a rear plane 290 of fuel storage tank 272. Rear plane 290 of fuel storage tank 272 being a vertical plane passing through the rear-most point of fuel storage tank 272. In the illustrated embodiment, the connection between handlebars 132 and upper bracket 260 is located rearward of front plane 288 and below top plane 284.

By having fuel storage tank 272 positioned such that at least a portion 292 thereof is forward of portion 286 of middle portion 278 of steering assembly 130 assists in moving a center of gravity 298 (see FIG. 1) of two-wheeled vehicle 100 forward. For touring motorcycles, such as the illustrated embodiment of two-wheeled vehicle 100, a large portion of the load of the motorcycle is generally positioned over rear wheel 112. For example, the load of the operator and/or passenger is generally carried by the rear wheel 112. Further, any cargo positioned within saddlebags 176, 178 and/or removable trunk 174 (shown in phantom in FIG. 1) is generally carried by the rear wheel 112. By moving more of the load forward, vehicle 100 has increased cargo carrying capability and better stability when an operator holds vehicle 100 upright while stopped.

Referring to FIG. 1, additional steps have been taken with regard to vehicle 100 to lower center of gravity 298 of two-wheeled vehicle 100 and to move center of gravity 298 towards front wheel 110. As one example, of shifting center of gravity 298 forward and lower, a battery of vehicle 100 whose location 300 is shown in phantom in FIG. 1 is located in front of engine 124 behind front wheel 110. The battery is used to provide power for the electrical start of vehicle 100 to start vehicle 100 and/or power various accessories or lights of vehicle 100 while engine 124 is not running.

Location 300 of the battery also provides for easy access to the battery. Battery cables may be attached to the battery without removing any of the body panels of vehicle 100 or removing seat 102 of vehicle 100. As such, the battery may be charged or jumped without the removal of seat 102 or any of the body panels.

In one embodiment, center of gravity 298 is about 487 mm (about 19.17 inches) above ground 114 and about 3% forward of a midpoint of a line connecting front axle 264 of front wheel 110 and a rear axle 265 (see FIG. 5) of rear wheel 112 when vehicle 100 is full of fluids without taking into account the weight of the trunk 174, the weight of any cargo, or the weight of the operator or passenger. Thus, the load between front wheel 110 and rear wheel 112 is generally balanced.

Figure 12:
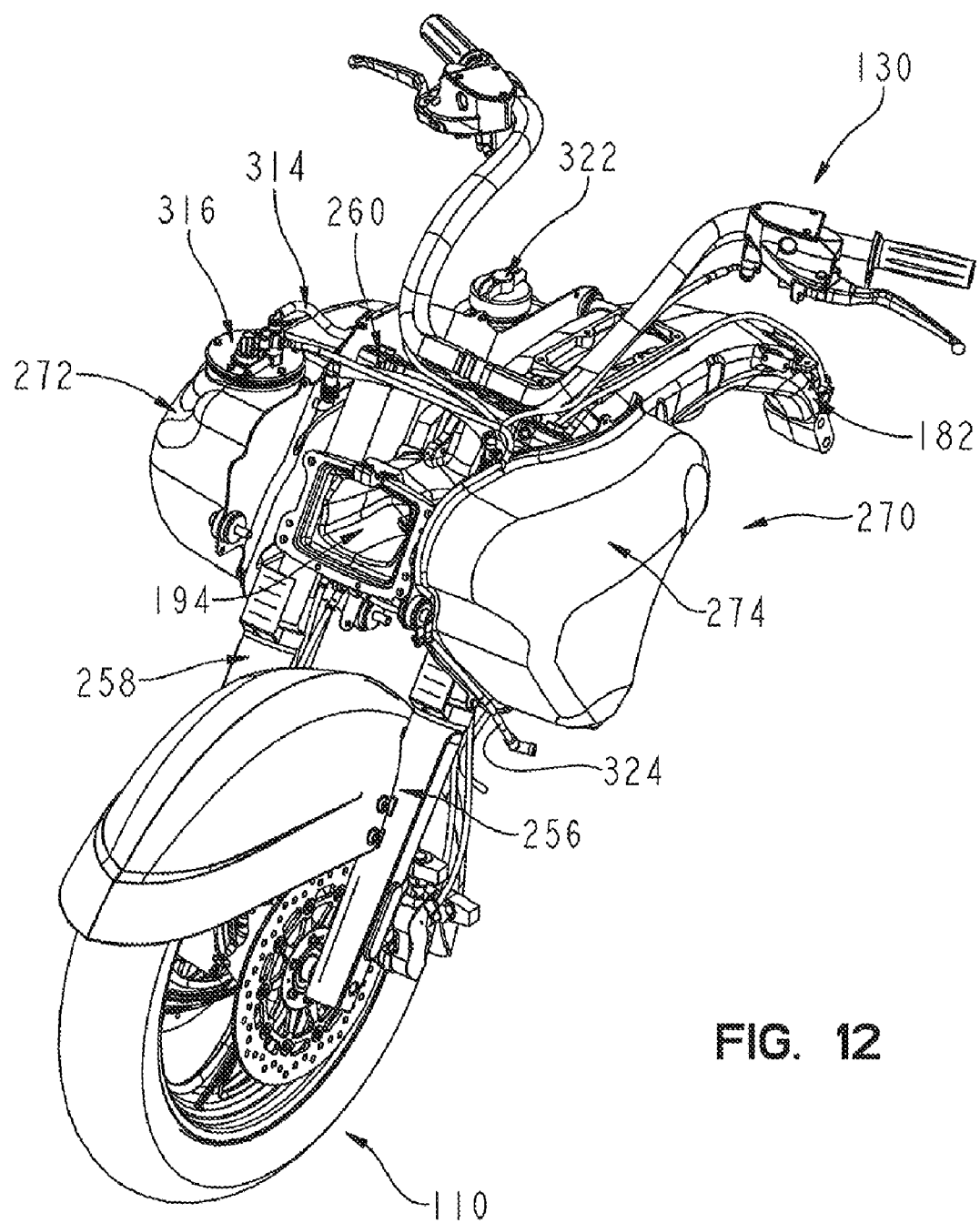
FIG. 12 is a perspective view of the two fuel storage tanks of FIG. 10 located relative to the steering assembly of FIG. 8 and the front frame member of FIG. 5.

Referring to FIG. 12, the fuel storage system 270 of vehicle 100 is shifted forward compared to traditional motorcycles which further assists in balancing the load between front wheel 110 and rear wheel 112. As shown in FIG. 12, right fuel storage tank 272 is positioned on a right side of front frame member 182 and outward of front frame member 182 and left fuel storage tank 274 is positioned on a left side of front frame member 182 and outward of front frame member 182. Right fuel storage tank 272 and left fuel storage tank 274 are supported by front frame member 182 and are positioned around the air channel 192 within front frame member 182. In one embodiment, right side fuel storage tank 272 and left side fuel storage tank 274 are positioned to balance the fuel load of vehicle 100 about centerline plane 116. Steering assembly 130 is positioned between right side fuel storage tank 272 and left side fuel storage tank 274. In one embodiment, at least a portion of one or both of right fuel storage tank and left fuel storage tank overlaps at least one of a top portion of front frame member 182 and a bottom portion of front frame member 182.

Figure 11:
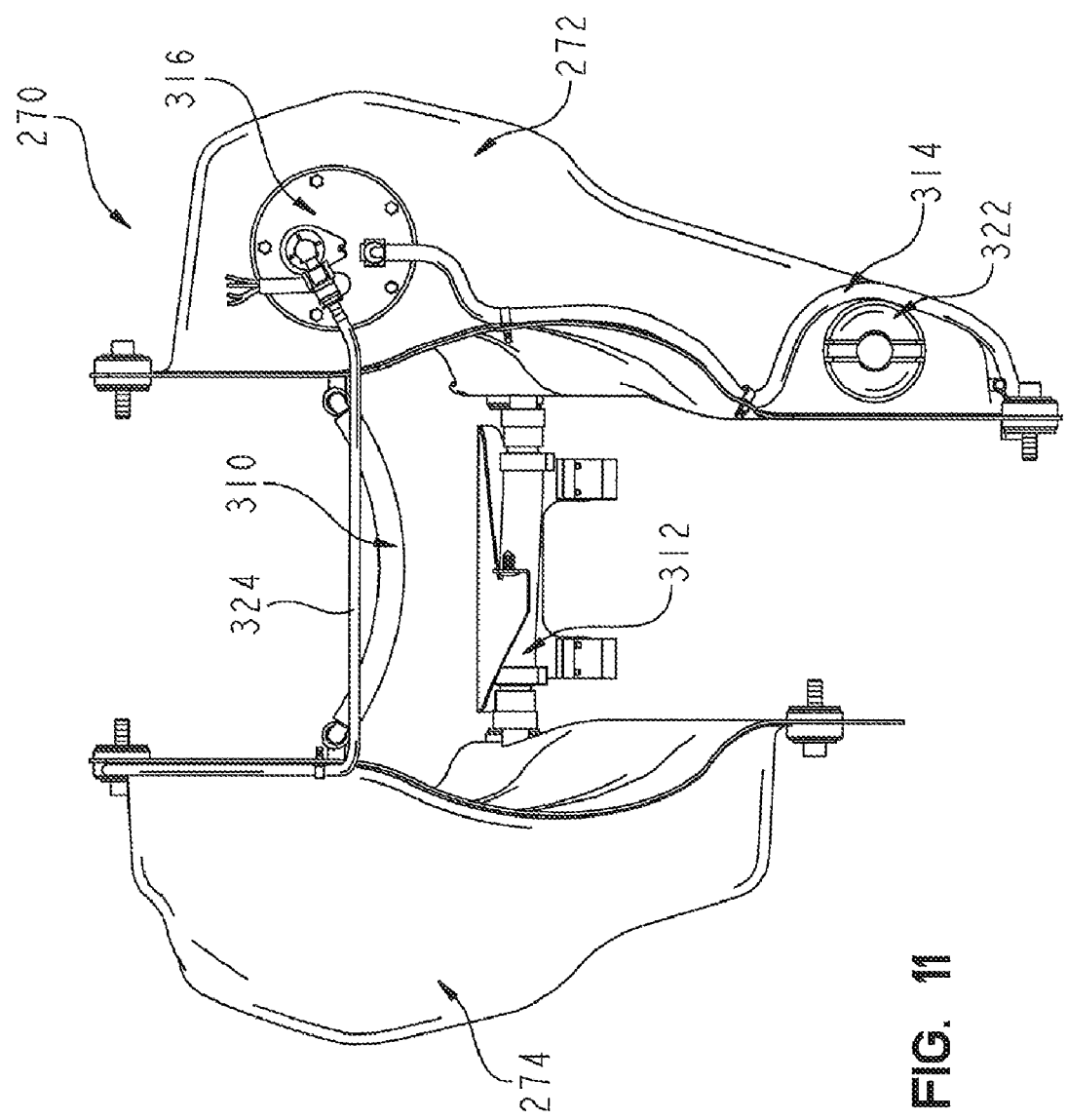
FIG. 11 is a top of the two fuel storage tanks of FIG. 10.

Referring to FIGS. 10 and 11, right side fuel storage tank 272 and left side fuel storage tank 274 are in fluid communication with each other through an upper fluid conduit 310 and a lower fluid conduit 312. Fuel is provided from fuel storage system 270 through a fuel line 314 to engine 124. Fuel line 314 is connected to a fuel pump 316 located in right side fuel storage tank 272. Fuel pump 316 pumps fuel from the interior of right side fuel storage tank 272 through fuel line 314 to engine 124. In one embodiment, fuel pump 316 has an integrated roll-over valve built into it as a safety precaution. Also connected to fuel pump 316 is a vent line 324 which is coupled to canister (not shown) filled with filter-activated charcoal.

Figure 2:
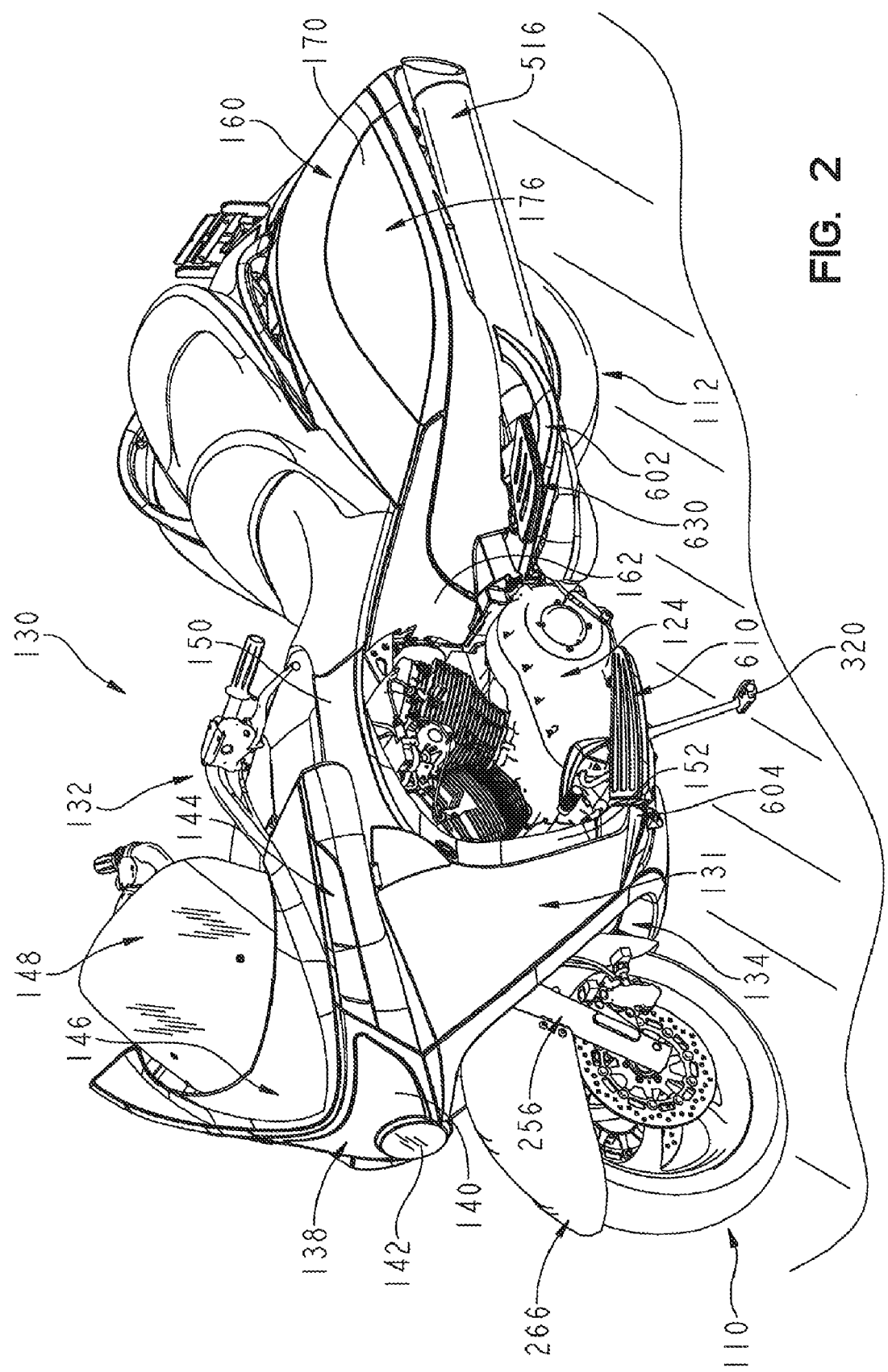
FIG. 2 is an perspective view of the two-wheeled vehicle of FIG. 1.

As shown in FIG. 2, vehicle 100 includes a side stand 320. Vehicle 100, like many motorcycles, is supported by front wheel 110, rear wheel 112, and side stand 320 when an operator is not positioned on vehicle 100. One of example of when this is likely the case is when an operator is introducing fuel into fuel storage system 270. To introduce fuel into fuel storage system 270, a gas cap 322 is removed from right side fuel storage tank 272. Gas is then introduced into right side fuel storage tank 272. In one embodiment, storage tank 272 includes a filler neck (not shown) that extends down into tank 272 from gas cap 322 which controls the amount of fuel that may be put in tank 272 and tank 274. Fuel in right side fuel storage tank 272 travels through line 312 into left side fuel storage tank 274 due to the leaning of vehicle 100 to the left side because vehicle 100 is supported on side stand 320. Line 310 connects the airspace above the fuel in left side fuel storage tank 274 and right side fuel storage tank 272. As fuel travels from right side fuel storage tank 272 into left side fuel storage tank 274 air is displaced through line 310 from left side fuel storage tank 274 into right side fuel storage tank 272.

In one embodiment, gas cap 322 includes a vapor and pressure release valve. The vapor and pressure release valve prevents the presence of unwanted pressure fluctuations being present in fuel storage tanks 272, 274. For example, if line 324 gets pinched and the fuel pump 316 continues to pump fuel out of tank 272, tank 272 may implode unless air is permitted to enter tank 272 through the vapor and pressure release valve of gas cap 322.

Returning to FIG. 5, a swing arm 380 is rotatably coupled to rear frame member 184 through a pivot shaft 382. Swing arm 380 may rotate downward in direction 384 away from rear frame member 184 and upward in direction 386 toward rear frame member 184. Swing arm 380 includes a left arm 390, a right arm 392 and a middle portion 394. Rear wheel 112 is received in the area 396 between left arm 390 and right arm 392 and rearward of middle portion 394. In one embodiment, swing arm 380 is a one-piece casting. In one example, swing arm 380 is cast through a lost core process.

Figure 14:
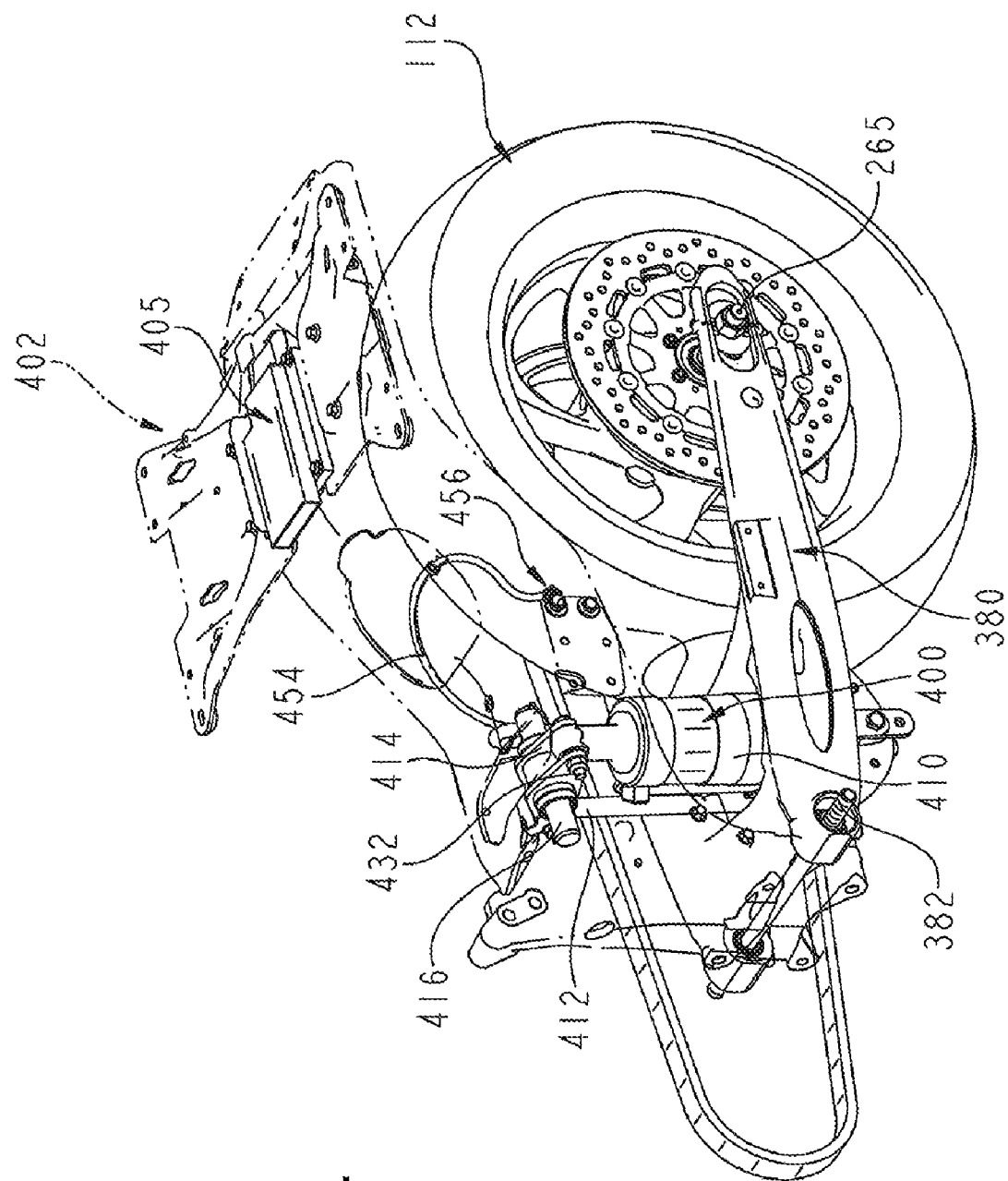
FIG. 14 is a view of the assembly of FIG. 13 with the rear frame member being shown in phantom to illustrate the rear suspension.
Figure 15:
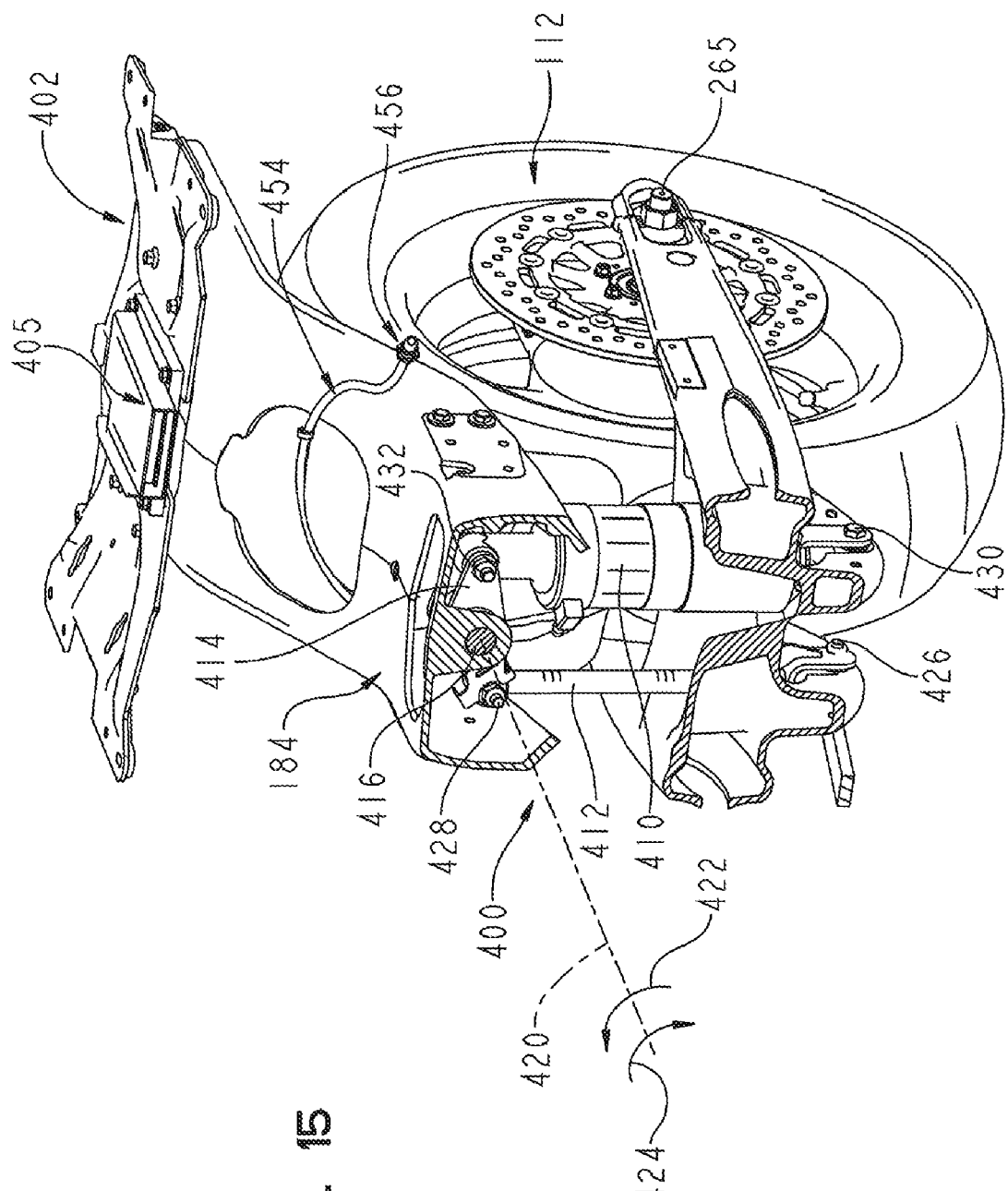
FIG. 15 is a front perspective view with the rear frame member shown in section to illustrate the rear suspension.

As explained herein, a rear suspension 400 is coupled to swing arm 380 through middle portion 394. Referring to FIGS. 13-15, rear suspension 400 is shown.

Referring to FIG. 13, rear frame member 184 and swing arm 380 are shown assembled. Further, rear wheel 112 is shown assembled to swing arm 380. In one embodiment, rear axle 265 is coupled to swing arm 380 with a clip. Additional details regarding the coupling of an axle to a chassis are found in U.S. patent application Ser. No. 11/085,754, filed Mar. 21, 2005, published as U.S. Published Patent Application No. US2006-0226631 A1, the disclosure of which is expressly incorporated by reference herein.

Further, a support bracket 402 is shown attached to rear frame member 184. Support bracket 402 supports saddlebags 176 and 178 and other components of the rear body of two-wheeled vehicle 100. Saddlebag 176 is supported by a left portion 404 of support bracket 402 and saddlebag 178 is supported by a right portion 406 of support bracket 402. Support bracket 402 also serves as a heat sink for the electronic control module ("ECM") 405 of vehicle 100 which is supported by a middle portion 408 of support bracket 402.

As shown in the FIG. 13, rear frame member 184 and swing arm 380 are rotatably coupled through a first connection, pivot shaft 382. A second connection is made between rear frame member 184 and swing arm 380 through rear suspension 400. In one embodiment, swing arm 380 and rear suspension are coupled to the frame in less than three locations. In one embodiment, swing arm 380 and rear suspension are coupled to the frame in two locations.

Referring to FIG. 15, rear suspension 400 includes a shock absorber 410, a pushrod 412, and a connecting link 414. The linkage of pushrod 412 and connecting link 414 scale the movement of the shock absorber 410 by a multiplication factor to correlate to the movement of swing arm 380.

As shown in FIG. 15, connecting link 414 is rotatably connected to rear frame member 184 through a pivot pin 416 and associated bearing and rotatable about a horizontal axis 420 in directions 422, 424. Pushrod 412 is rotatably coupled to swing arm 380 through a coupler 426 received in a rubber bushing and is rotatably coupled to connecting link 414 through a coupler 428. In one embodiment, coupler 428 is a spherical bearing along with a bolt and nut. Shock absorber 410 is rotatably coupled to swing arm 380 through a coupler 430 received in a rubber bushing and is rotatably coupled to connecting link 414 through a coupler 432. In one embodiment, coupler 432 is a spherical bearing along with a bolt and nut. Shock absorber 410 has shown in FIG. 15 is coupled to swing arm 380 and rear frame member 184 in a generally vertical orientation. In one embodiment, shock absorber 410 is an air shock available from KYB America LLC located at 140 N. Mitchell Court, Addison, Ill. 60101.

In one embodiment, shock absorber 410 is an air adjustable shock. Referring to FIG. 14, shock absorber 410 has a suspension adjuster coupled thereto, illustratively air line 454. The amount of air in shock absorber 410 may be adjusted upward or downward by adding air to shock absorber 410 or removing air from shock absorber 410, respectively. In one embodiment, an air inlet valve 456 is accessible from within rear bodywork 160. An operator may couple air inlet valve 456 to a standard air compressor to adjust the amount of air in shock absorber 410. By being capable to adjust the amount of air in air shock 410, an operator may adjust the ride height of vehicle 100 for the amount of cargo weight being carried.

Referring to FIG. 13A, air inlet valve 456 extends through an opening 181 in a saddlebag base member 175 and is secured to saddlebag base member 175 with a retainer 183, illustratively a nut. Saddlebag base member is coupled to support bracket 402 and rear frame member 184. The location of opening 181 is covered by saddlebag cover 179, when saddlebag cover 179 is in a closed position, such as shown in FIG. 1. As such, an operator would open saddlebag cover 179 to access air inlet valve 456 which extends through opening 181. By having opening 181 in a spaced apart location from storage compartment 177, an operator does not need to disturb and/or remove any cargo to access air inlet line 456.

Figures 16A, 16B:
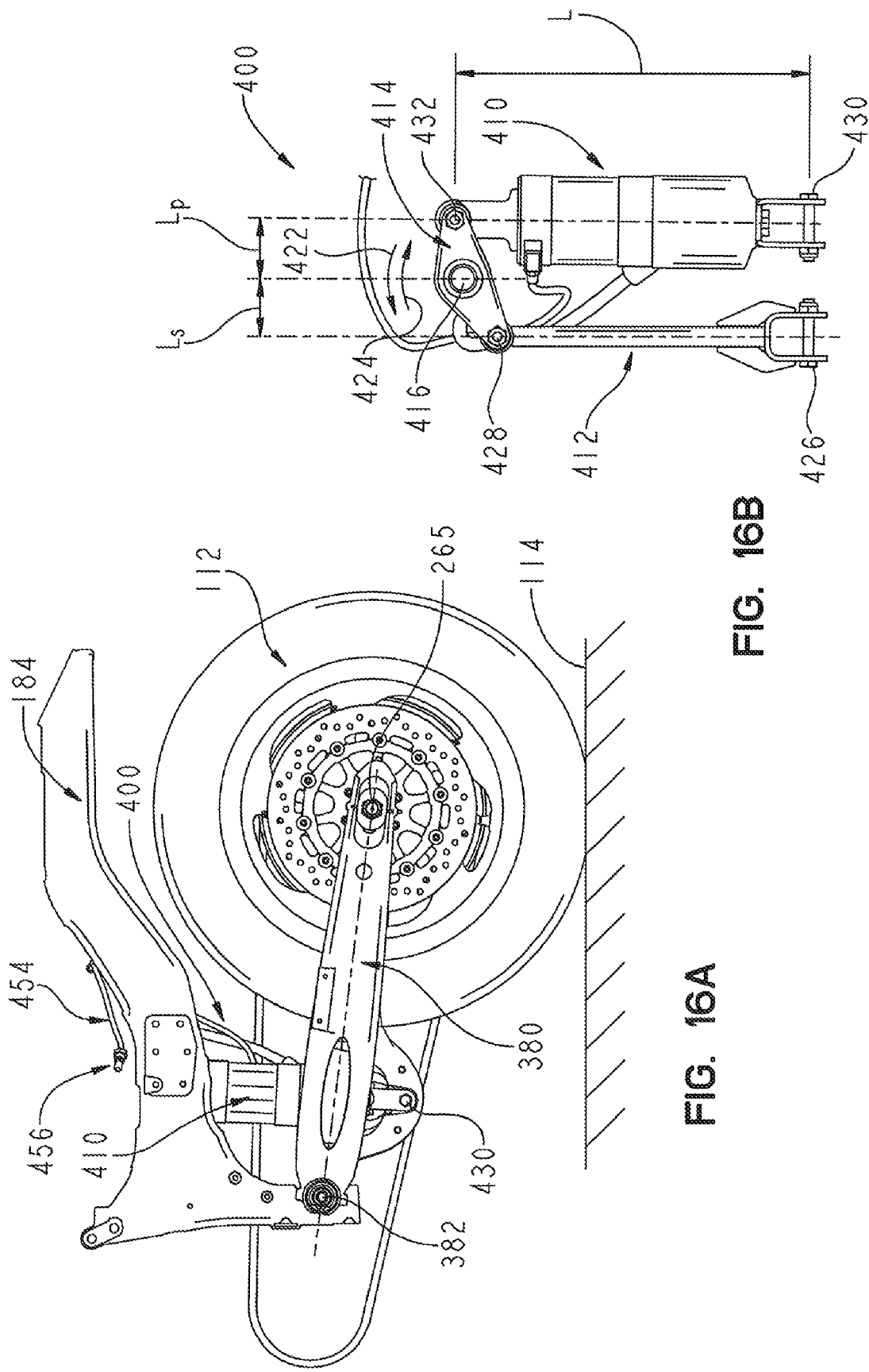
FIG. 16A is a side view of the assembly of FIG. 13 with the rear suspension being in an extended state.
FIG. 16B illustrates the rear suspension in the extended state corresponding to FIG. 16A.

As shown in FIG. 16A, rear suspension 400 is arranged such that pushrod 412 and connecting link 414 move in a plane which is not parallel to the centerline plane 116 of vehicle 100. In the illustrated embodiment, pushrod 412 and connecting link 414 move in a plane which is perpendicular to the centerline plane 116 of the vehicle 100. In one embodiment, pushrod 412 and connecting link 414 move in multiple planes, each of which is not parallel to the centerline plane.

Referring to FIGS. 16-19, the operation of rear suspension 400 is described. As described herein, rear suspension 400 exhibits a generally constant motion ratio through the travel range of rear suspension 400. In one embodiment, rear suspension 400 is arranged so that pushrod 412 and connecting link 414 move in a plane which is not parallel to the centerline plane 116 of vehicle 100, but the motion ratio of rear suspension 400 is one of either a linear rising rate through the travel range of rear suspension 400 or a generally linear falling rate through the travel range of rear suspension 400. In one embodiment, rear suspension 400 is arranged so that pushrod 412 and connecting link 414 move in a plane which is parallel to the centerline plane 116 of vehicle 100 and the motion ratio of rear suspension 400 is generally constant through the travel range of rear suspension 400.

Figures 18A, 18B:
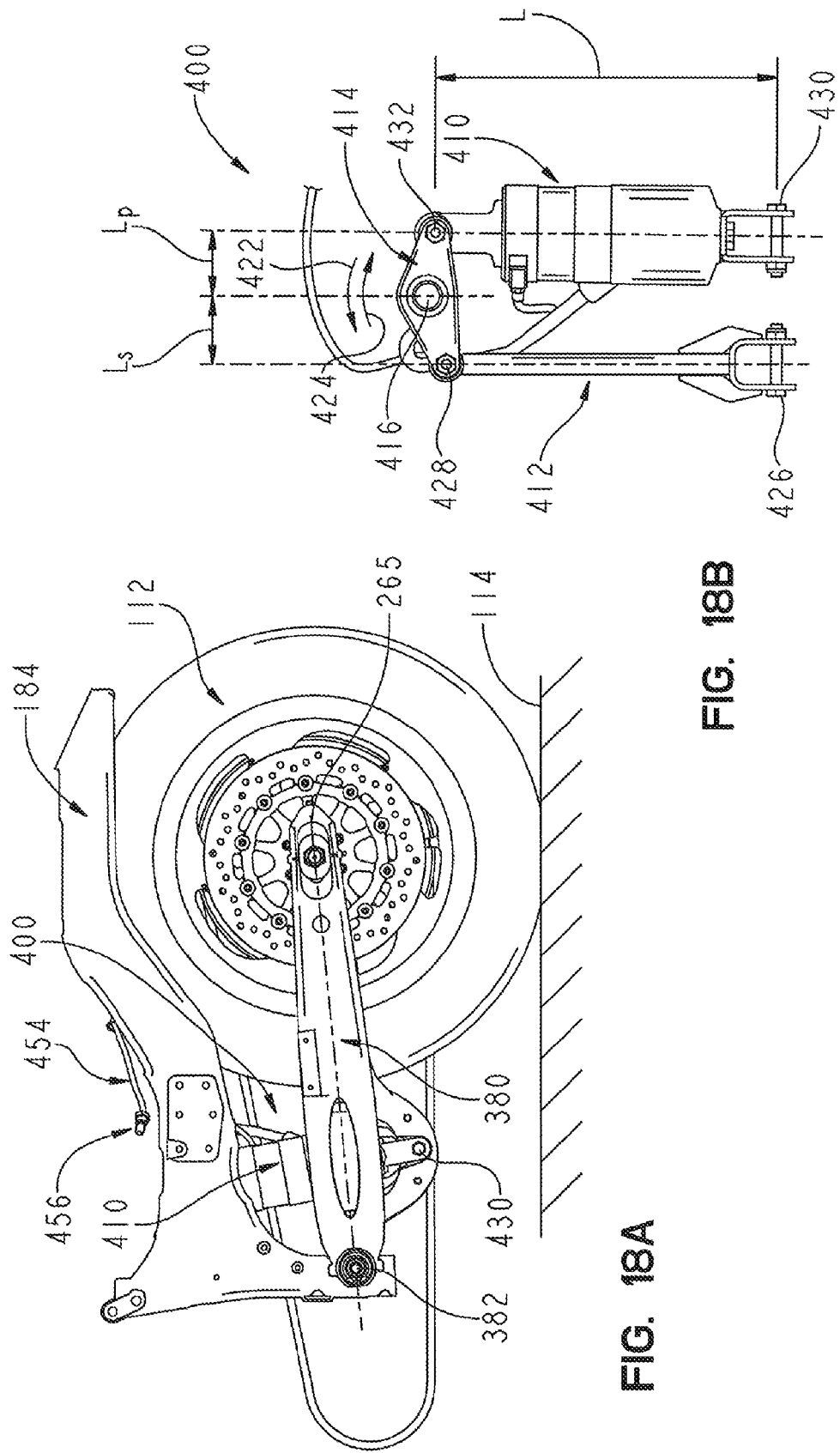
FIG. 18A is a side view of the assembly of FIG. 13 with the rear suspension being in a compressed state.
FIG. 18B illustrates the rear suspension in the compressed state corresponding to FIG. 18A.

FIG. 16A illustrates a side view of rear frame member 184, swing arm 380, rear wheel 112, and rear suspension 400 when rear suspension 400 is in an extended state. FIG. 16B illustrates rear suspension 400 when in the extended state of FIG. 16A. FIG. 17A illustrates a side view of rear frame member 184, swing arm 380, rear wheel 112, and rear suspension 400 when rear suspension 400 is in a mid-travel state. FIG. 17B illustrates rear suspension 400 when in the mid-travel state of FIG. 17A. FIG. 18A illustrates a side view of rear frame member 184, swing arm 380, rear wheel 112, and rear suspension 400 when rear suspension 400 is in a compressed state. FIG. 18B illustrates rear suspension 400 when in the compressed state of FIG. 18A. In one embodiment, rear suspension 400 has about 5 inches (about 12.7 centimeters) of rear suspension travel and a seat height ($d_1$ in FIG. 21) of up to about 26.5 inches (about 67.31 centimeters).

In the extended state shown in FIG. 16B, a length (L) of shock absorber 410 is extended. The upper coupler 432 connecting shock absorber 410 and connecting link 414 is generally higher than the upper coupler 428 connecting pushrod 412 and connecting link 414. Connecting link 414 is rotated from horizontal in direction 422. The extended state corresponds to a state wherein vehicle 100 is not supporting an operator, passenger, or cargo.

In the mid-travel state shown in FIG. 17B, due to the upward movement of swing arm 380 shock absorber 410 is compressed thereby reducing a length (L) of shock absorber 410 compared to the extended state. In one embodiment, a lower portion of shock absorber 410 moves upward with swing arm 380 and an upper portion of shock absorber 410 moves downward due to the rotation of connecting link 414. This may be due to the addition of an operator or cargo. The upper coupler 432 connecting shock absorber 410 and connecting link 414 is lower compared to the extended state and the upper coupler 428 connecting pushrod 412 and connecting link 414 is higher compared to the extended state. Connecting link 414 is rotated in direction 424 relative to the extended state.

In the compressed state shown in FIG. 18B, a length (L) of shock absorber 410 is reduced compared to the mid-travel state. This may be due to the addition of both an operator and cargo and/or the further addition of a passenger. The upper coupler 432 connecting shock absorber 410 and connecting link 414 is lower compared to the mid-travel state and the upper coupler 428 connecting pushrod 412 and connecting link 414 is higher compared to the mid-travel state. Connecting link 414 is rotated in direction 424 relative to the mid-travel state.

Figure 19:
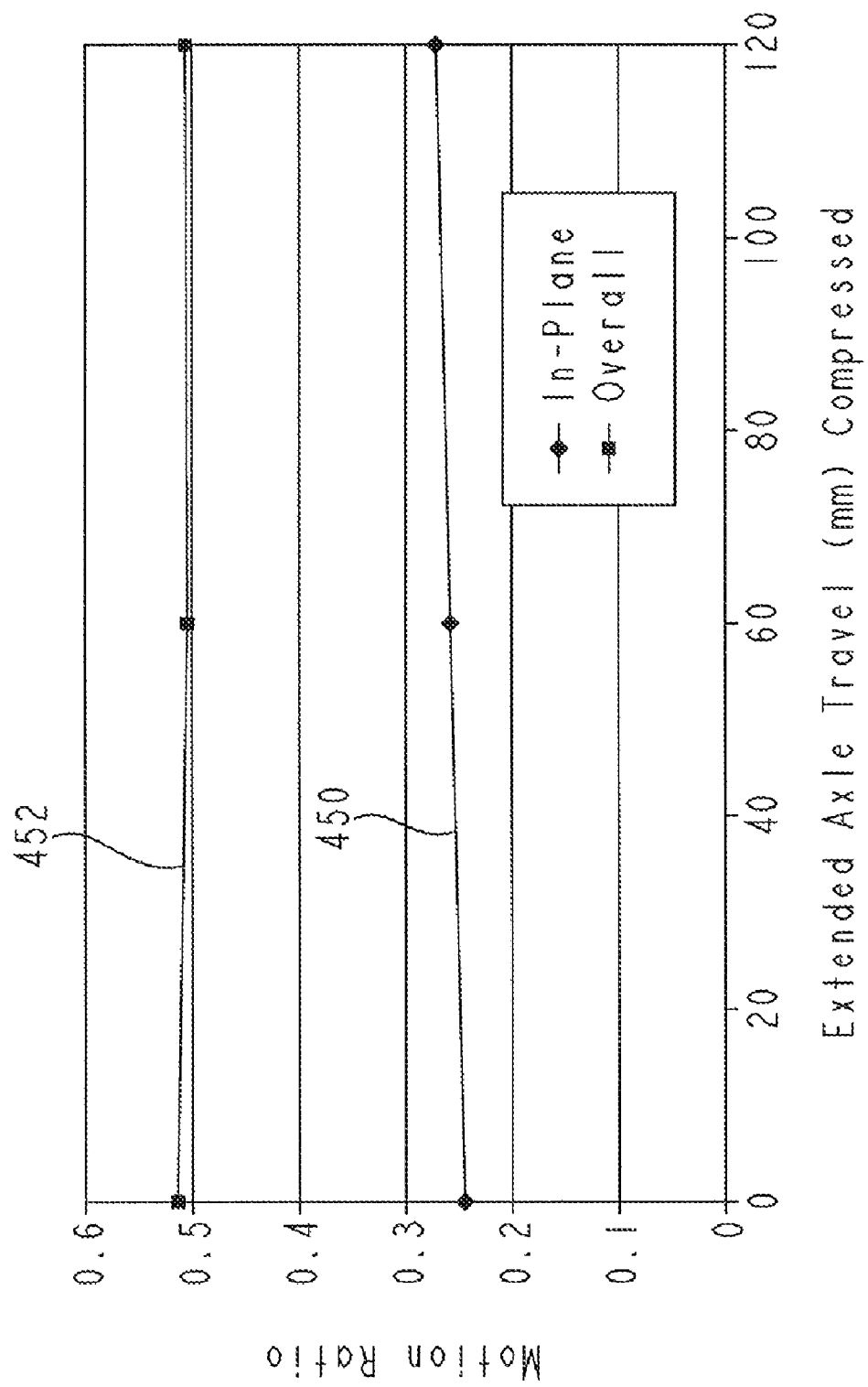
FIG. 19 illustrates an exemplary motion ratio for the rear suspension of FIG. 13.

As mentioned herein, rear suspension 400 has a generally constant overall motion ratio (MR) through the suspension travel. Motion ratio is the rear axle 265 displacement divided by the shock absorber 410 displacement. Referring to FIG. 19, as represented by line 450 when considering only the movement from a side view (FIGS. 16A, 17A, 18A) which is in-plane with the centerline plane 116 of vehicle 100 the motion ratio of rear suspension 400 is progressive or increasing with the extent of the travel. The motion ratio when considering only the in-plane movement may be calculated as the ratio of the length of the lever arm causing the linkage of rear suspension 400 to move (the horizontal distance from the pivot of the swing arm 380 with rear frame member 184 to rear axle 265) and the length of the lever arm that the linkage works through (the perpendicular distance from the pivot of the swing arm 380 with rear frame member 184 to the pivot of the shock absorber and the swingarm). In one embodiment, the motion ratio from the side view increases about 10.3% as the swingarm moves upward.

In contrast, the movement of the linkage, pushrod 412 and connecting link 414, is arranged in one embodiment to achieve a regressive motion ratio of about 26%. When combined with the progressive nature of the shock absorber 410 and the progressive in-plane motion ratio, a generally constant motion ratio is achieved. The geometry of the connecting link 414 and the placement of the pivot points (couplers 428, 432) dictate the motion ratio of the linkage. In one embodiment, the pivot locations of couplers 428, 430 are designed to give an overall generally constant motion ratio which is less than about 1.5. In the illustrated embodiment, the pivot locations of couplers 428, 430 are designed to give an overall linkage motion ratio of approximately 0.5, and to ensure that this motion ratio is constant through the suspension travel range. The overall motion ratio of rear suspension 400 is represented by line 452 in FIG. 19.

The calculation of the overall motion ratio may be carried out as follows. The motion ratio (MR) may be found from equation 1

$$MR = \frac{Dshock}{Daxle} \quad (1)$$

wherein MR=Motion ratio; Dshock=Displacement (change in length) of shock absorber 410; and Daxle=Displacement of rear axle 265.

The displacement of the shock absorber 410 may be found from equation 2

$$Dshock = Dtop + Dbottom \quad (2)$$

wherein Dtop=Displacement of top of shock absorber 410 relative to the motorcycle chassis 180 and Dbottom=Displacement of the bottom of the shock absorber 410 relative to the motorcycle chassis 180. Dbottom may also be expressed as $$Dbottom = Daxle \frac{Llinkage}{Lswingarm} \quad (3)$$

wherein Llinkage=The perpendicular distance between the swingarm pivot and the shock absorber axis and Lswingarm=the perpendicular distance between the swingarm pivot and the centerline of the rear axle. Dtop may also be expressed as $$Dtop = Dbottom\left(\frac{Ls}{Lp}\right) = Daxle\left(\frac{Llinkage}{Lswingarm}\right)\left(\frac{Ls}{Lp}\right) \quad (4)$$

wherein Ls=Perpendicular distance between the shock absorber axis and the pivot of connecting link 414 and Lp=Perpendicular distance between the pushrod axis and the pivot of connecting link 414.

Substituting equations 3 and 4 into equation 2, Dshock may be expressed as $$Dshock = Daxle\left(\frac{Llinkage}{Lswingarm}\right) + Daxle\left(\frac{Llinkage}{Lswingarm}\right)\left(\frac{Ls}{Lp}\right) \quad (5a)$$

$$Dshock = Daxle\left(\frac{Llinkage}{Lswingarm}\right)\left(1 + \frac{Ls}{Lp}\right) \quad (5b)$$

Further, as stated in equation 1, MR is the ratio of Dshock to Daxle. Therefore, MR may be expressed as $$\frac{Dshock}{Daxle} = \left(\frac{Llinkage}{Lswingarm}\right)\left(1 + \frac{Ls}{Lp}\right) \quad (6a)$$

$$MR = \left(\frac{Llinkage}{Lswingarm}\right)\left(1 + \frac{Ls}{Lp}\right) \quad (6b)$$

The graph in FIG. 19 may be generated based on equations 1-6. Again, line 450 represents the progressive nature of the in-plane portion of the motion ratio that would be seen if there was no connecting link 414 or pushrod 412, and the shock absorber 410 was connected to swing arm 380 at the bottom and chassis 180 at the top. Line 452 represents the overall motion ratio and shows the effect of the added linkage components on the overall motion ratio. As can be seen on the graph in FIG. 19, the in-plane linkage is progressive, but the overall motion ratio is constant through the travel range. In one embodiment, the generally constant motion ratio is a desirable characteristic for good ride comfort.

In one embodiment, two shock absorbers are used in place of rear suspension 400. Each shock absorber is connected to swing arm 380 and rear frame member 184.

Figure 21:
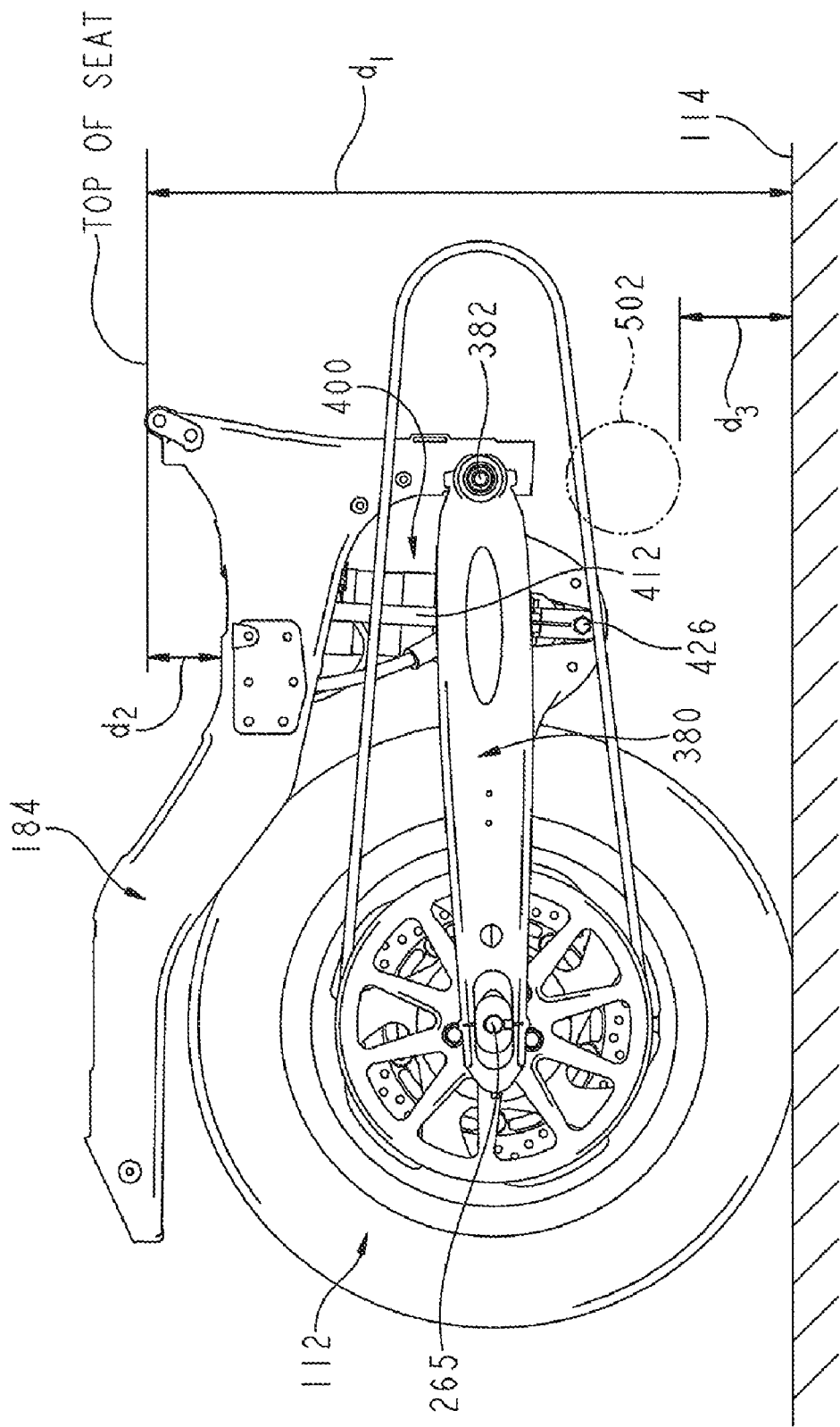
FIG. 21 is a side view of the assembly of FIG. 13 and illustrates the cross-over location of the exhaust system of FIG. 20.

Referring to FIG. 21, the configuration of rear suspension 400, permits the seat height location of vehicle 100 to be lowered. As shown in FIG. 21, a top surface of seat 102 in an area corresponding to where the operator would be seated is a distance $d_1$ from ground 114. The distance $d_1$ also takes into account a depth $d_2$ of padding positioned below the seat surface to cushion the ride of the operator. Exemplary padding includes foam. In one embodiment, the distance $d_1$ is about 26.5 inches (about 67.31 centimeters) and the distance $d_2$ is about 4.0 inches (about 10.16 centimeters) while maintaining a ground clearance $d_3$ of about 5 inches (about 12.7 centimeters) with the operator of about 180 pounds on vehicle 100 and no cargo. In one embodiment, the operator seat has a height above a lower portion of the location 502 of up to about 21.5 inches $(d_1-d_3)$.

The configuration of rear suspension 400 also permits enough clearance to permit the exhaust system 500 to cross underneath swing arm 380 at a location 502. In one embodiment, the exhaust system 500 extends rearward from engine 124 towards rear wheel 112 passing in front of rear wheel 112 from a first side of vehicle 100 to a second side of vehicle 100 at a height lower than pivot axle 382.

Figure 20:
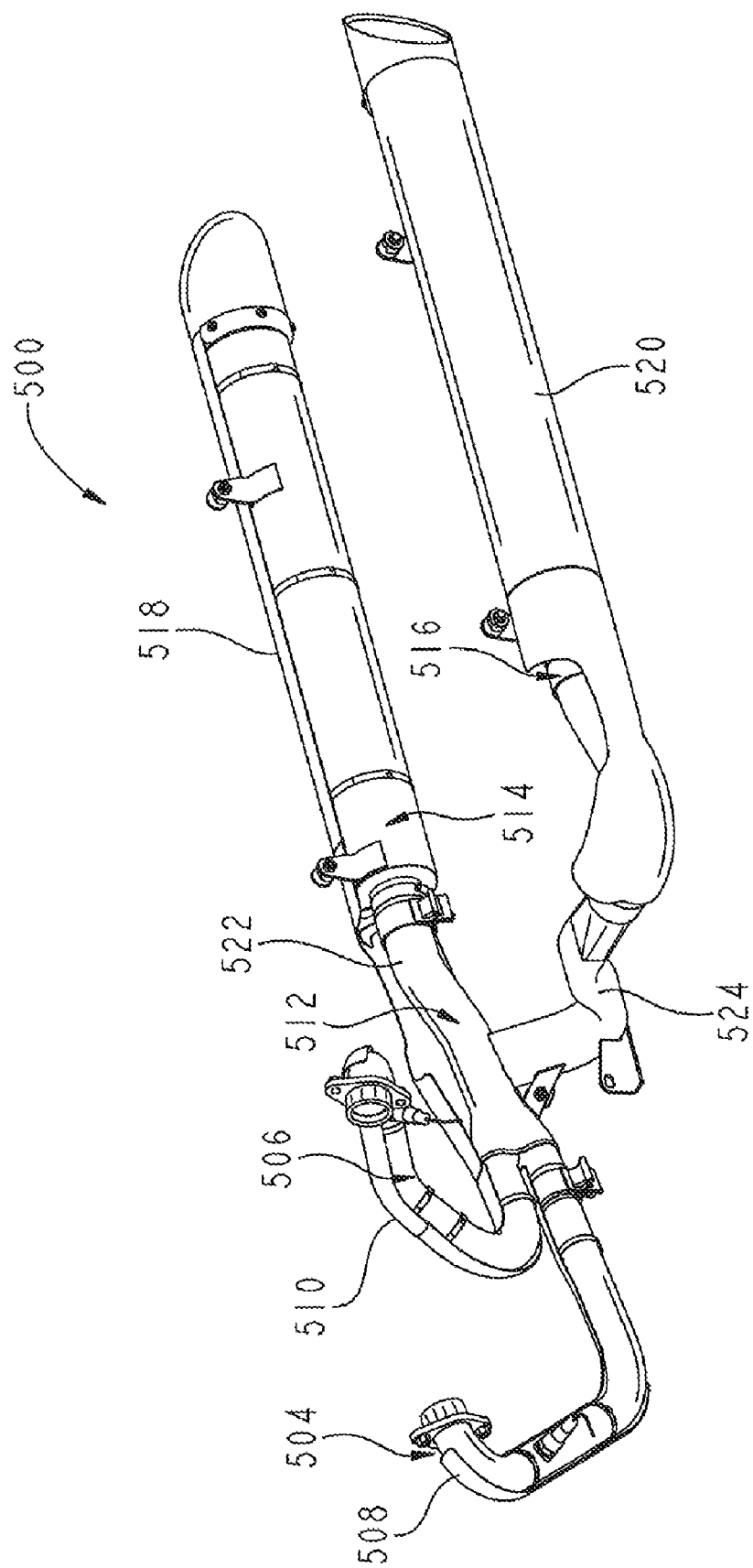
FIG. 20 is a perspective view of an exhaust system of the two-wheeled vehicle of FIG. 1.

Referring to FIG. 20, exhaust system 500 is shown. Exhaust system 500 includes a front headpipe 504 which connects to a front cylinder of engine 124 and a rear headpipe 506 which connects to a rear cylinder of engine 124. Each of front headpipe 504 and rear headpipe 506 has a respective weld-shield 508, 510 which covers an exterior of the respective headpipe 504, 506. Headpipes 504 and 506 are each connected to a cross-over section 512. Cross-over section 512 is connected to a right side muffler 514 and a left side muffler 516. Right side muffler 514 and a left side muffler 516 are each covered by a respective weld-shield 518, 520. Exhaust from engine 124 is communicated to headpipes 504 and 506 which in turn communicate the exhaust to cross-over section 512. Cross-over section 512 then communicates the exhaust to right side muffler 514 and left side muffler 516 which are in fluid communication with the atmosphere.

Cross-over section 512 includes a first section 522 which is connected to right side muffler 514 and a second section 524 which is connected to left side muffler 516. Right side muffler 514 is located on a right side of rear wheel 112. Left side muffler 516 is located on a left side of rear wheel 112. Second section 524 passes under swing arm 380 through location 502.

In one embodiment, vehicle 100 includes a tip-over system 600 which prevents an unwanted tip-over of vehicle 100 from a generally vertical position. In various situations, two-wheeled vehicles may tip over when left unattended or when being walked by an operator. This results in unwanted damage to various components, such as mirrors and body panels.

Referring to FIG. 4, tip-over apparatus 600 includes a left rear tip-over apparatus 602, a left front tip-over apparatus 604, a right rear tip-over apparatus 606, and a right front tip-over apparatus 608. Right front tip-over apparatus 608 is a mirror image of left front tip-over apparatus 604. Right rear tip-over apparatus 606 is a mirror image of left rear tip-over apparatus 602.

In one embodiment, vehicle 100 may be supported by either right front tip-over apparatus 608 and right rear tip-over apparatus 606 or left front tip-over apparatus 604 and left rear tip-over apparatus 602 when tipped from vertical to either the right side or the left side, respectively. Right front tip-over apparatus 608 and right rear tip-over apparatus 606 and left front tip-over apparatus 604 and left rear tip-over apparatus 602 are designed to support vehicle 100 when full of fuel and carrying about 65 pounds (about 29.48 kilograms) of cargo. The presence of right front tip-over apparatus 608 and right rear tip-over apparatus 606 and left front tip-over apparatus 604 and left rear tip-over apparatus 602 also prevent vehicle 100 from falling over on a leg of the operator pinning the operator under vehicle 100.

Referring to FIG. 2, left front tip-over apparatus 604 is located forward of footrest 610. Left front tip-over apparatus 604 is supported by chassis 180.

Figure 22:
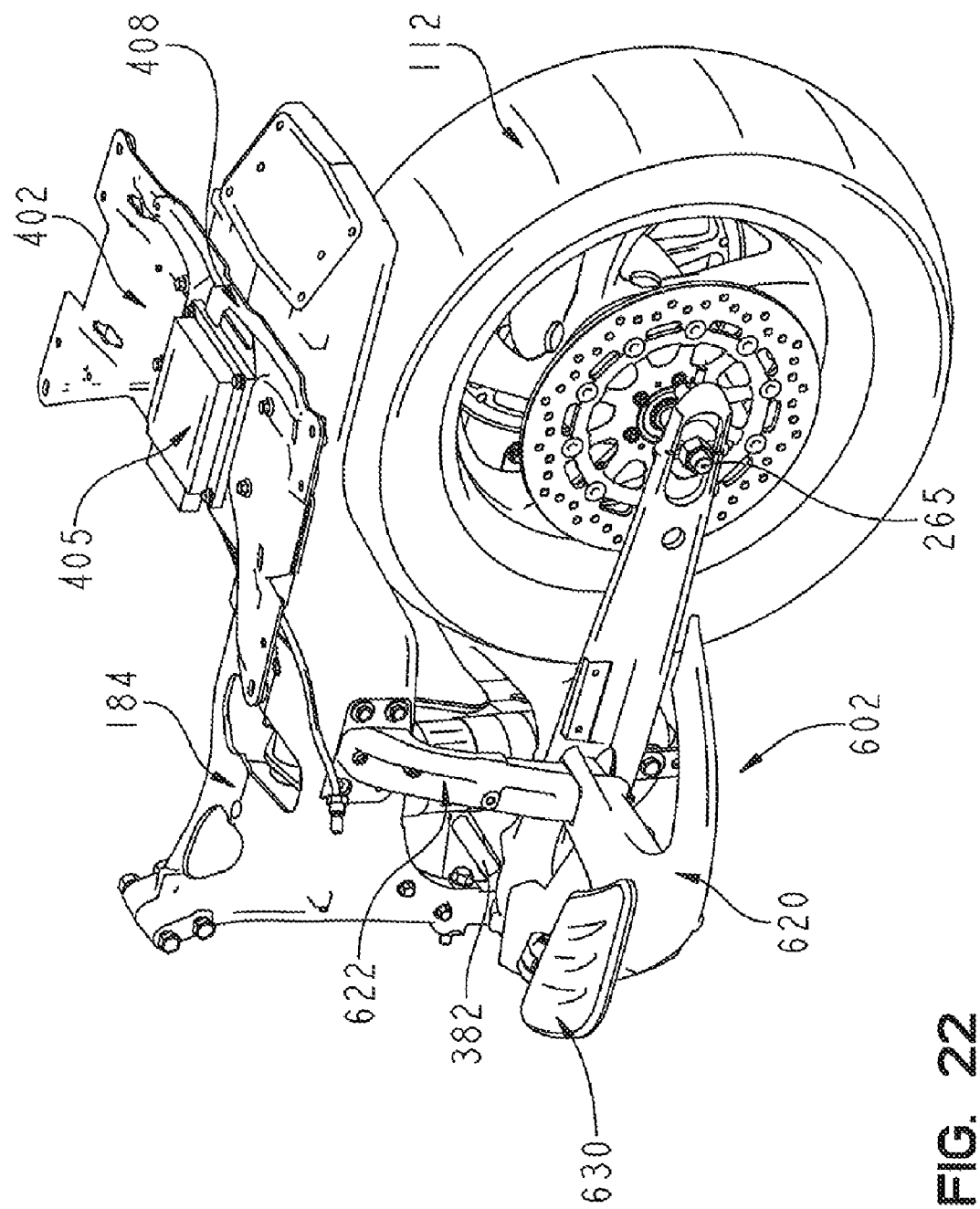
FIG. 22 is a perspective view of the assembly of FIG. 13 and a rear tip-over apparatus.
Figure 23:
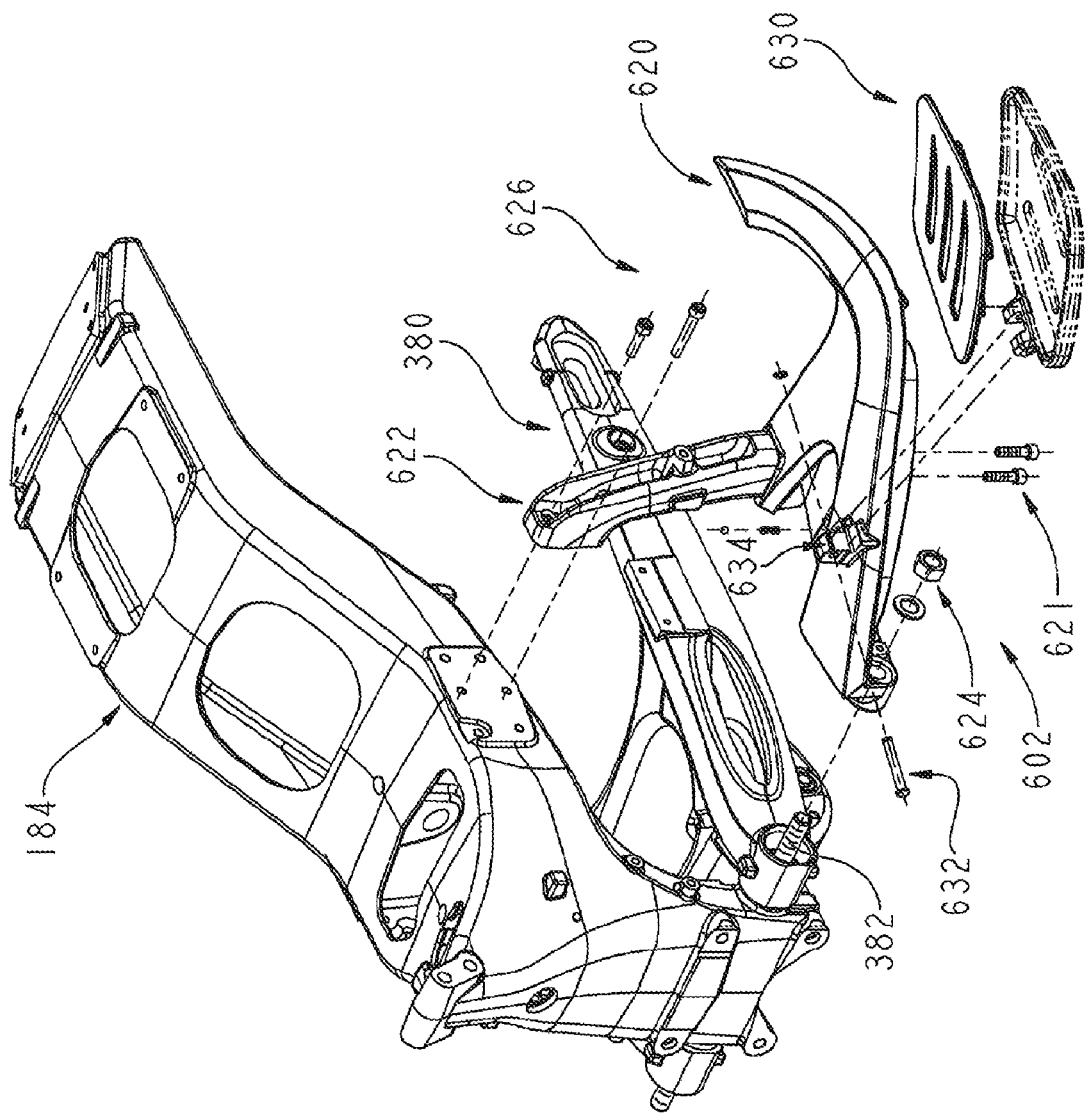
FIG. 23 is a perspective exploded assembly view of the rear tip-over apparatus of FIG. 22.

Referring to FIGS. 22 and 23, left rear tip-over apparatus 602 is shown. Referring to FIG. 23 left rear tip-over apparatus 602 includes a generally horizontally extending wing 620 and a generally vertically extending support member 622 coupled to the horizontally extending wing 620 through couplers 621.

The horizontally extending wing 620 is coupled to the swing arm pivot shaft 382. Swing arm pivot shaft 382 includes a threaded end section which cooperates with a fastener 624 to couple the horizontally extending wing 620 to the remainder of vehicle 100. The vertically extending support member 622 is coupled to rear frame member 184 with couplers 626. Left rear tip-over apparatus 602 is fixed to rear frame member 184 and does not move along with swing arm 380.

The horizontally extending wing 620 also serves as a support for a second set of footrests 630 which may be used by a passenger of vehicle 100. Footrests 630 are rotatably coupled to horizontally extending wing 620 through a coupler 632 which is received by a mounting feature 634 of horizontally extending wing 620.

Figure 24:
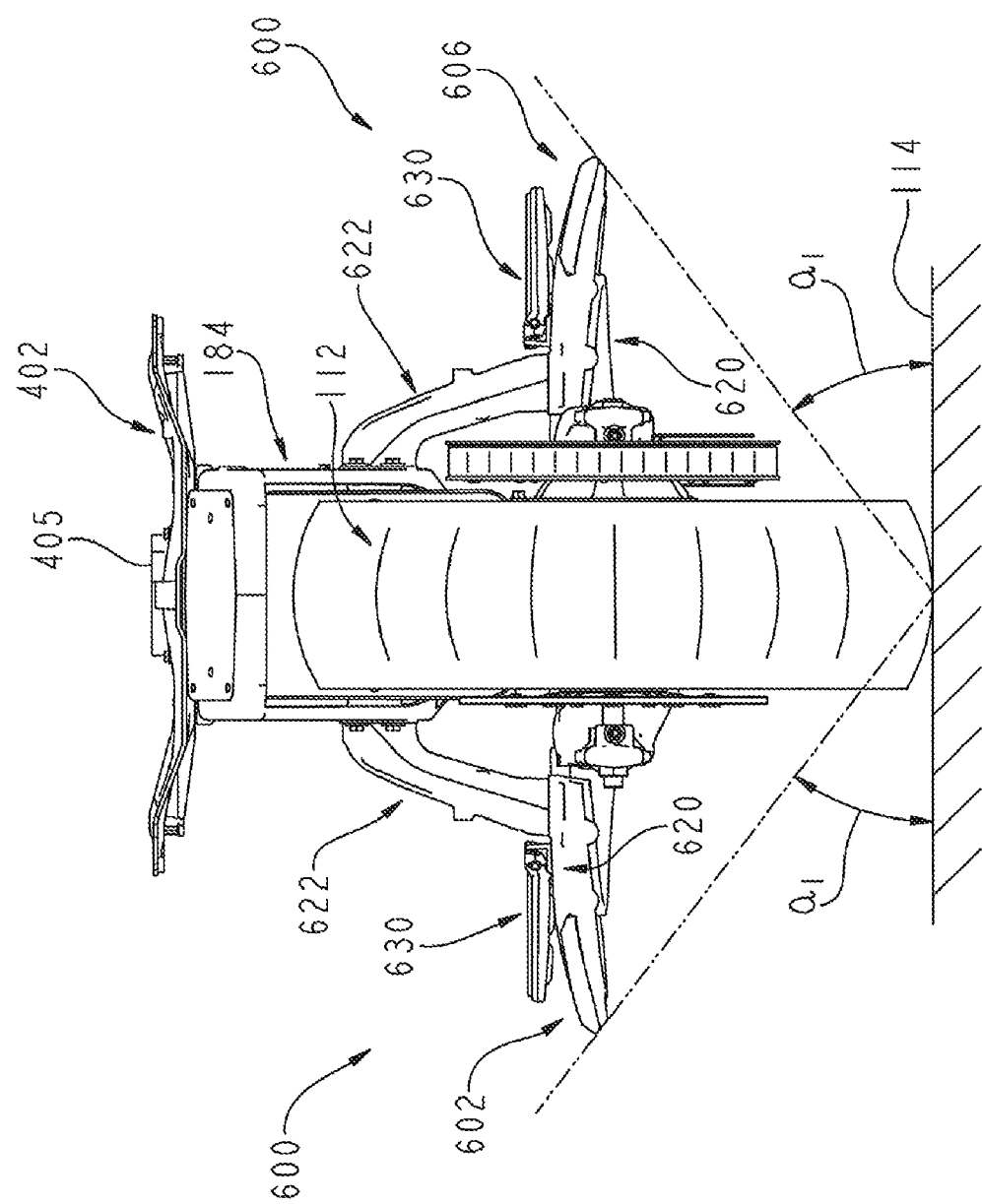
FIG. 24 is a rear view of the assembly of FIG. 13 including a left-side rear tip over apparatus and a right side rear tip-over apparatus.

Referring to FIG. 24, tip-over system 600 permits vehicle 100 to tip to the left or right up to an angle $a_1$ relative to ground 114. At angle $a_1$ the front fairing 132 and saddlebags 176 and 178 are not in contact with ground 114 nor any other components of vehicle 100 except for front wheel 110, rear wheel 112, and tip over system 600. In one embodiment, angle $a_1$ is about 46°.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A two-wheeled vehicle, comprising
a front wheel;
a rear wheel generally positioned in line with the front wheel along a longitudinal plane of the two-wheeled vehicle;
a frame supported by the front wheel and the rear wheel;
an engine coupled to the frame and operably coupled to the rear wheel to power the rear wheel;
a steering assembly coupled to the front wheel, the steering assembly being moveable to steer the front wheel; and a fuel storage tank supported by the frame and operably coupled to the engine, wherein the steering assembly includes an upper portion above a top horizontal plane of fuel storage tank and a lower portion below a bottom horizontal plane of the fuel storage tank, the lower portion being coupled to the upper portion through a middle portion, at least a portion of the middle portion being positioned rearward of a front vertical plane of the fuel storage tank and the top horizontal plane of the fuel storage tank being above the frame and the upper portion of the steering assembly extends rearward of a rear vertical plane of the fuel storage tank.

2. The two-wheeled vehicle of claim 1, wherein the fuel storage tank is positioned laterally outward of the middle portion of the steering assembly.

3. The two-wheeled vehicle of claim 2, further comprising a second fuel storage tank having a portion positioned laterally outward of the middle portion of the steering assembly.

4. The two-wheeled vehicle of claim 3, wherein the fuel storage tank is positioned to a first side of the longitudinal plane of the two-wheeled vehicle and the second fuel storage tank is positioned to a second side of the longitudinal plane of the two-wheeled vehicle.

5. The two-wheeled vehicle of claim 4, wherein an interior of the fuel storage tank and an interior of the second fuel storage tank are in fluid communication.

6. The two-wheeled vehicle of claim 5, wherein a first fluid conduit connects in fluid communication a lower portion of the interior of the fuel storage tank and a lower portion of the interior of the second fuel storage tank and a second fluid conduit connects in fluid communication an upper portion of the interior of the fuel storage tank and an upper portion of the interior of the second fuel storage tank.

7. The two-wheeled vehicle of claim 1, wherein the middle portion is forward of a back vertical plane of the fuel storage tank.

8. The two-wheeled vehicle of claim 1, wherein the top portion includes handlebars.

9. The two-wheeled vehicle of claim 1, wherein the middle portion includes a lower portion of a handlebar member.

10. The two-wheeled vehicle of claim 1, wherein a center of gravity of the two-wheeled vehicle is generally balanced between the front wheel and the rear wheel.

11. The two-wheeled vehicle of claim 10, wherein the center of gravity is about 3 percent forward of a midpoint of a line connecting an axle of the front wheel and an axle of the rear wheel.

12. The two-wheeled vehicle of claim 11, wherein the center of gravity is about 487 mm above the ground.

13. A two-wheeled vehicle, comprising
a front wheel;
a rear wheel generally positioned in line with the front wheel along a longitudinal plane of the two-wheeled vehicle;
a frame supported by the front wheel and the rear wheel;
an engine coupled to the frame and operably coupled to the rear wheel to power the rear wheel;
a steering assembly coupled to the front wheel, the steering assembly being moveable to steer the front wheel; and
a plurality of fuel storage tanks supported by the frame and operably coupled to the engine, wherein a first fuel storage tank and a second fuel storage tank are positioned forward of the rear wheel and in a generally side-by-side configuration, the first fuel storage tank and the second fuel storage tank being in fluid communication with each other through an upper fluid conduit and a lower fluid conduit to permit fuel to flow between the first fuel storage tank and the second fuel storage tank, wherein fuel from the first fuel storage tank flows into the second fuel storage tank through the lower fluid conduit when the vehicle is positioned in a parked configuration wherein the second fuel storage tank is lower than the first fuel storage tank, the first fuel storage tank being in fluid communication with the engine through a fuel line coupled to the first fuel storage tank.

14. The two-wheeled vehicle of claim 13, wherein the first fuel storage tank is positioned to a first side of the longitudinal plane of the two-wheeled vehicle and the second fuel storage tank is positioned to a second side of the longitudinal plane of the two-wheeled vehicle.

15. The two-wheeled vehicle of claim 14, further comprising a side stand coupled to the frame, wherein the two-wheeled vehicle leans towards the second side when the two-wheeled vehicle is positioned in the parked configuration with the side stand supporting the two-wheeled vehicle and wherein the first fuel storage tank includes a fuel inlet to which a fuel cap is removably coupled.

16. The two-wheeled vehicle of claim 15, wherein fuel from the second fuel storage tank must travel into the first fuel storage tank to reach the fuel line.

17. A two-wheeled vehicle, comprising
a front wheel;
a rear wheel generally positioned in line with the front wheel along a longitudinal plane of the two-wheeled vehicle;
a frame supported by the front wheel and the rear wheel;
an engine coupled to the frame and operably coupled to the rear wheel to power the rear wheel;
an airbox in fluid communication with the engine;
a plurality of fuel storage tanks supported by the frame and operably coupled to the engine, wherein the plurality of fuel storage tanks overlap at least two sides of the air box; and
a fuel pump in fluid communication with the plurality of fuel storage tanks and the engine, wherein fuel within a first fuel storage tank of the plurality of fuel storage tanks must travel into a second fuel storage tank of the plurality of fuel storage tanks to reach the fuel pump.

18. The two-wheeled vehicle of claim 17, wherein the first fuel storage tank is positioned laterally outward of the air box.

19. The two-wheeled vehicle of claim 17, wherein an air channel within an interior of the frame forms the air box.

20. The two-wheeled vehicle of claim 19, wherein the first fuel storage tank of the plurality of fuel storage tanks is positioned above a portion of the air box, below the portion of the air box, and to a first side of the air box.

21. The two-wheeled vehicle of claim 20, wherein a second fuel storage tank of the plurality of fuel storage tanks is positioned generally to a second side of the air box opposite the first side.

22. The two-wheeled vehicle of claim 21, wherein the first fuel storage tank is positioned to a first side of the longitudinal plane of the two-wheeled vehicle and the second fuel storage tank is positioned to a second side of the longitudinal plane of the two-wheeled vehicle.

23. The two-wheeled vehicle of claim 22, wherein an interior of the first fuel storage tank and an interior of the second fuel storage tank are in fluid communication.

24. The two-wheeled vehicle of claim 23, wherein the first fuel storage tank and the second fuel storage tank are supported by the air box.

25. The two-wheeled vehicle of claim 17, wherein the fuel pump is positioned within the second fuel storage tank.

26. The two-wheeled vehicle of claim 17, wherein the two sides of the airbox are a first airbox side positioned to a first side of a longitudinal plane of the two-wheeled vehicle and a second airbox side positioned to a second side of the longitudinal plane of the two-wheeled vehicle.

27. A two-wheeled vehicle, comprising a front wheel;

a rear wheel generally positioned in line with the front wheel along a longitudinal plane of the two-wheeled vehicle;

a frame supported by the front wheel and the rear wheel;

an engine coupled to the frame and operably coupled to the rear wheel to power the rear wheel;

a steering assembly coupled to the front wheel, the steering assembly being moveable to steer the front wheel;

a plurality of fuel storage tanks supported by the frame and operably coupled to the engine, wherein a first fuel storage tank and a second fuel storage tank are positioned forward of the rear wheel and in a generally side-by-side configuration with a portion of the frame interposed therebetween; and a fuel pump in fluid communication with the plurality of fuel storage tanks and the engine, wherein fuel within the first fuel storage tank must travel into the second fuel storage tank to reach the fuel pump.

28. The two-wheeled vehicle of claim 27, wherein the fuel pump is positioned within the second fuel storage tank.

29. A two-wheeled vehicle, comprising a front wheel;

a rear wheel generally positioned in line with the front wheel along a longitudinal plane of the two-wheeled vehicle;

a frame supported by the front wheel and the rear wheel;

an engine coupled to the frame and operably coupled to the rear wheel to power the rear wheel;

an airbox in fluid communication with the engine; and a plurality of fuel storage tanks supported by the frame and operably coupled to the engine, wherein the plurality of fuel storage tanks overlap at least two sides of the air box, a first fuel storage tank of the plurality of fuel storage tanks and a second fuel storage tank of the plurality of fuel storage tanks being in fluid communication with each other to permit fuel to flow between the first fuel storage tank and the second fuel storage tank.

30. The two-wheeled vehicle of claim 29, wherein the two sides of the airbox are a first airbox side positioned to a first side of a longitudinal plane of the two-wheeled vehicle and a second airbox side positioned to a second side of the longitudinal plane of the two-wheeled vehicle.

31. A two-wheeled vehicle, comprising a front wheel;

a rear wheel generally positioned in line with the front wheel along a longitudinal plane of the two-wheeled vehicle;

a frame supported by the front wheel and the rear wheel, the frame including a first frame member;

an engine coupled to the frame and operably coupled to the rear wheel to power the rear wheel;

an airbox in fluid communication with the engine;

a plurality of fuel storage tanks supported by the frame and operably coupled to the engine, wherein the plurality of fuel storage tanks overlap at least two sides of the air box; and a fuel pump in fluid communication with the plurality of fuel storage tanks and the engine, wherein fuel within a first fuel storage tank of the plurality of fuel storage tanks must travel into a second fuel storage tank of the plurality of fuel storage tanks to reach the fuel pump and an air channel within an interior of the first frame member forms the air box.

32. The two-wheeled vehicle of claim 31, wherein the first fuel storage tank is positioned laterally outward of the air box.

33. The two-wheeled vehicle of claim 31, wherein the first fuel storage tank of the plurality of fuel storage tanks is positioned above a portion of the air box, below the portion of the air box, and to a first side of the air box.

34. The two-wheeled vehicle of claim 33, wherein the second fuel storage tank of the plurality of fuel storage tanks is positioned generally to a second side of the air box opposite the first side.

35. The two-wheeled vehicle of claim 34, wherein the first fuel storage tank is positioned to a first side of the longitudinal plane of the two-wheeled vehicle and the second fuel storage tank is positioned to a second side of the longitudinal plane of the two-wheeled vehicle.

36. The two-wheeled vehicle of claim 35, wherein an interior of the first fuel storage tank and an interior of the second fuel storage tank are in fluid communication.

37. The two-wheeled vehicle of claim 36, wherein the first fuel storage tank and the second fuel storage tank are supported by the airbox.

* * * * *